US011996021B2

(12) United States Patent
Cheon et al.

(10) Patent No.: US 11,996,021 B2
(45) Date of Patent: May 28, 2024

(54) ELECTRONIC DEVICE INCLUDING EXPANDABLE DISPLAY AND CONTENT PROVISION METHOD

(71) Applicant: SAMSUNG ELECTRONICS CO., LTD., Suwon-si (KR)

(72) Inventors: Kawon Cheon, Suwon-si (KR); Hyoin Ahn, Suwon-si (KR); Yeojun Yoon, Suwon-si (KR); Soojung Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/194,090

(22) Filed: Mar. 31, 2023

(65) Prior Publication Data
US 2023/0245607 A1     Aug. 3, 2023

Related U.S. Application Data

(63) Continuation of application No. PCT/KR2021/017058, filed on Nov. 19, 2021.

(30) Foreign Application Priority Data

Nov. 20, 2020   (KR) ..................... 10-2020-0156418

(51) Int. Cl.
    *G09G 3/00*    (2006.01)
    *G06F 3/14*    (2006.01)

(52) U.S. Cl.
    CPC ........... *G09G 3/035* (2020.08); *G06F 3/1454* (2013.01); *G09G 2340/0442* (2013.01);
    (Continued)

(58) Field of Classification Search
    CPC ....... G09G 2370/16; G09G 2340/0442; G09G 2340/0464; G09G 2340/0492; G09G 2354/00; G06F 3/1454
    See application file for complete search history.

(56) References Cited

U.S. PATENT DOCUMENTS

| 9,860,474 B2 | 1/2018 | Park et al. |
| 10,001,645 B2 | 6/2018 | Norden |

(Continued)

FOREIGN PATENT DOCUMENTS

| JP | 2017511943 A | 4/2017 |
| KR | 20140144029 A | 12/2014 |

(Continued)

OTHER PUBLICATIONS

International Search Report for PCT/KR2021/017058 dated Feb. 18, 2022, 3 pages.

(Continued)

*Primary Examiner* — Abbas I Abdulselam
(74) *Attorney, Agent, or Firm* — Nixon & Vanderhye, P.C.

(57) ABSTRACT

An electronic device according to various embodiments comprises: a housing, a display including a main display area and at least one expandable display area, the at least one expandable display area is hidden in the housing in a slide-in state and exposed to outside in a slide-out state and the main display area is exposed to outside in the slide-in state and the slide-out state, a communication module including communication circuitry, and a processor operatively connected to the display and the communication module, wherein the processor is configured to: control the display to display first content on the main display area in the slide-in state in which the at least one expandable display area is hidden in the housing, establish a connection with an external device through the communication module, determine a first area to display the first content and a second area to display second content based on information received from the external device through the communication module in the slide-out state in which the at least one expandable display area is exposed to outside, and control the display to display the (Continued)

first content on the determined first area and display the second content on the determined second area based on the at least one expandable display area being exposed to outside.

20 Claims, 31 Drawing Sheets

(52) U.S. Cl.
CPC .............. *G09G 2340/0464* (2013.01); *G09G 2340/0492* (2013.01); *G09G 2354/00* (2013.01); *G09G 2370/02* (2013.01); *G09G 2370/16* (2013.01)

(56) References Cited

U.S. PATENT DOCUMENTS

| | | | |
|---|---|---|---|
| 10,045,066 B2 | 8/2018 | Lee et al. | |
| 10,216,398 B2 | 2/2019 | Woo et al. | |
| 10,452,156 B2 | 10/2019 | Kang et al. | |
| 10,613,587 B2 | 4/2020 | Hong et al. | |
| 10,878,728 B2 | 12/2020 | Yoon | |
| 11,164,544 B2 | 11/2021 | Yun | |
| 2013/0058063 A1 | 3/2013 | Obrien | |
| 2016/0202781 A1* | 7/2016 | Kim | H05K 1/028 345/173 |
| 2018/0260364 A1 | 9/2018 | Shim et al. | |
| 2019/0146557 A1 | 5/2019 | Choi et al. | |
| 2020/0265803 A1 | 8/2020 | Lee et al. | |

FOREIGN PATENT DOCUMENTS

| | | |
|---|---|---|
| KR | 101512364 B1 | 4/2015 |
| KR | 20160055553 A | 5/2016 |
| KR | 20170038308 A | 4/2017 |
| KR | 20180102907 A | 9/2018 |
| KR | 20180128261 A | 12/2018 |
| KR | 20190022157 A | 3/2019 |
| KR | 101993390 B1 | 6/2019 |
| KR | 20200007366 A | 1/2020 |
| KR | 20200075809 A | 6/2020 |
| KR | 20200100923 A | 8/2020 |
| KR | 102179289 B1 | 11/2020 |

OTHER PUBLICATIONS

Written Opinion of the ISA for PCT/KR2021/017058 dated Feb. 18, 2022, 4 pages.

* cited by examiner

ELECTRONIC DEVICE INCLUDING EXPANDABLE DISPLAY AND CONTENT PROVISION METHOD

CROSS-REFERENCE TO RELATED APPLICATIONS

This application is a continuation of International Application No. PCT/KR2021/017058 designating the United States, filed on Nov. 19, 2021, in the Korean Intellectual Property Receiving Office and claiming priority to Korean Patent Application No. 10-2020-0156418, filed on Nov. 20, 2020, in the Korean Intellectual Property Office, the disclosures of all of which are incorporated by reference herein in their entireties.

BACKGROUND

Field

The disclosure relates to an electronic device, for example, to a method of providing content to a display in an electronic device including an expandable display.

Description of Related Art

Electronic devices such as TVs, tablet PCs, smartphones, and the like may provide user experiences through various applications beyond their fundamental functions such as broadcast screen output or call functions. For example, an electronic device may provide a variety of multimedia content through a display and may also provide content shared with other electronic devices.

Recently, electronic devices having displays of various form factors have been developed to provide various user experiences and satisfy spatial efficiency. For example, electronic devices may be equipped with an expandable display such as a slidable or rollable display.

In the case where an electronic device is connected to another electronic device to share content, a display of the electronic device may output the shared content by completely covering the content previously provided by the electronic device, or a screen may be provided so as to be fixed to a specific position on the display, or unnecessary black areas may be caused.

SUMMARY

Embodiments of the disclosure provide an electronic device and a content provision method, in outputting content shared by other electronic devices to an expandable display, capable of expanding a display to output content of the electronic device and the shared content and appropriately arranging each piece of content on the expanded display.

An electronic device according to various example embodiments may include: a housing, a display including a main display area and at least one expandable display area, the at least one expandable display area is hidden in the housing in a slide-in state and exposed to outside in a slide-out state and the main display area is exposed to outside in the slide-in state and the slide-out state, a communication module including communication circuitry, and a processor operatively connected to the display and the communication module, wherein the processor is configured to: control the display to display first content on the main display area in the slide-in state in which the at least one expandable display area is hidden in the housing, establish a connection with an external device through the communication module, determine a first area to display the first content and a second area to display second content based on information received from the external device through the communication module in the slide-out state in which the at least one expandable display area is exposed to outside, and control the display to display the first content on the determined first area and display the second content on the determined second area based on the at least one expandable display area being exposed to outside.

According to various example embodiments, a method for providing content in an electronic device that includes a display including a main display area and at least one expandable display area, wherein the at least one expandable display area is hidden in a housing of the electronic device in a slide-in state and exposed to outside in a slide-out state and the main display area is exposed to outside in the slide-in state and the slide-out state, and the method including: displaying first content on the main display area in the slide-in state in which the at least one expandable display area is hidden in the housing, establishing a connection with an external device, determining a first area to display the first content and a second area to display second content based on information received from the external device through the established connection in the slide-out state in which the at least one expandable display area is exposed to outside, and displaying the first content on the determined first area and displaying the second content on the determined second area based on the at least one expandable display area being exposed to outside.

According to various example embodiments, it is possible to provide an electronic device and a content provision method capable of expanding a display to output content of the electronic device and shared content and appropriately arranging each piece of content on the expanded display.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
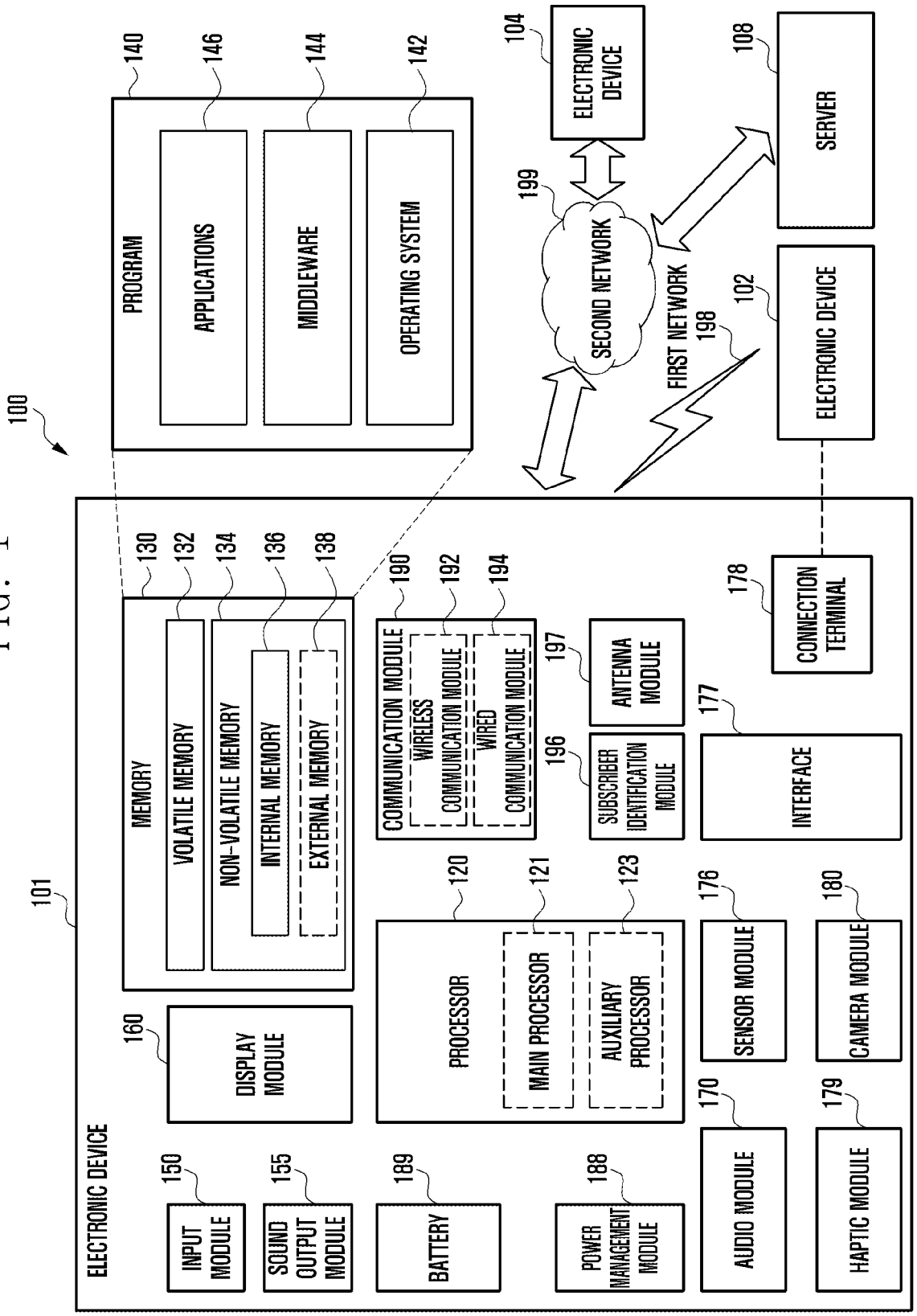
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102).

According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
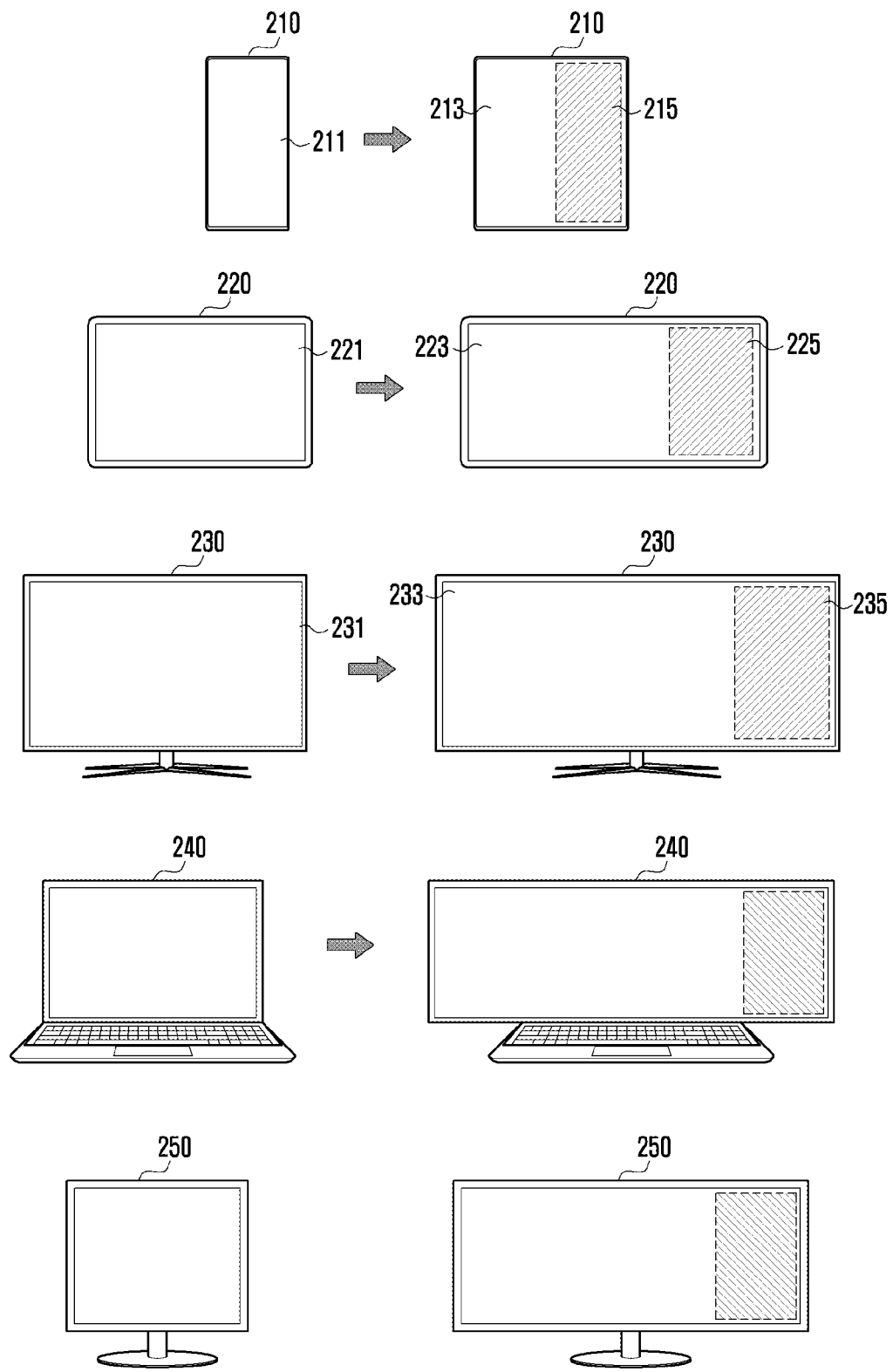
FIG. 2 is a diagram illustrating example electronic devices according to various embodiments.

FIG. 2 is a diagram illustrating example electronic devices according to various embodiments.

Referring to FIG. 2, an electronic device according to various embodiments may be implemented as a smartphone 210, a tablet PC 220, a TV set 230, a laptop computer 240, a monitor 250, or the like. Although various embodiments will be described based on specific types of electronic devices (e.g., a laptop, a monitor, and a TV set) in this disclosure, corresponding embodiments may be applied to other types of electronic devices (e.g., a tablet PC or a smartphone).

According to various embodiments, an electronic device may include an expandable display. For example, when a display is in a slide-in state, only a partial area (e.g., a main display area) of the display may be exposed (e.g., visible) to the outside so as to output a screen (211, 221, or 231), and the remaining area (e.g., an expandable display area) received inside the housing so as not be exposed to the outside may not output a screen in an inactive state. The terms "exposed" and "visible" when referring to a display herein may be used interchangeably and include a case where the display or screen is covered by a cover glass, cover layer or other protective sheet) When the display slides out, at least a portion of the area, which is not exposed (e.g., visible) to the outside in the slide-in state, may be exposed (e.g., visible) to the outside (215, 225, or 235), and such extended areas 215, 225, and 235 may switch to an active state, thereby displaying a screen.

FIGS. 3A, 3B, 3C and 3D are diagrams illustrating example structures of an expandable display of an electronic device according to various embodiments.

Hereinafter, although the structure of a tablet PC having an expandable display will be described with reference to FIGS. 3A, 3B, 3C and 3D, other types of devices (e.g., a laptop PC, a monitor, a TV set, and a smartphone) may also have an expandable display the same as or similar to the same.

Figure 3A:
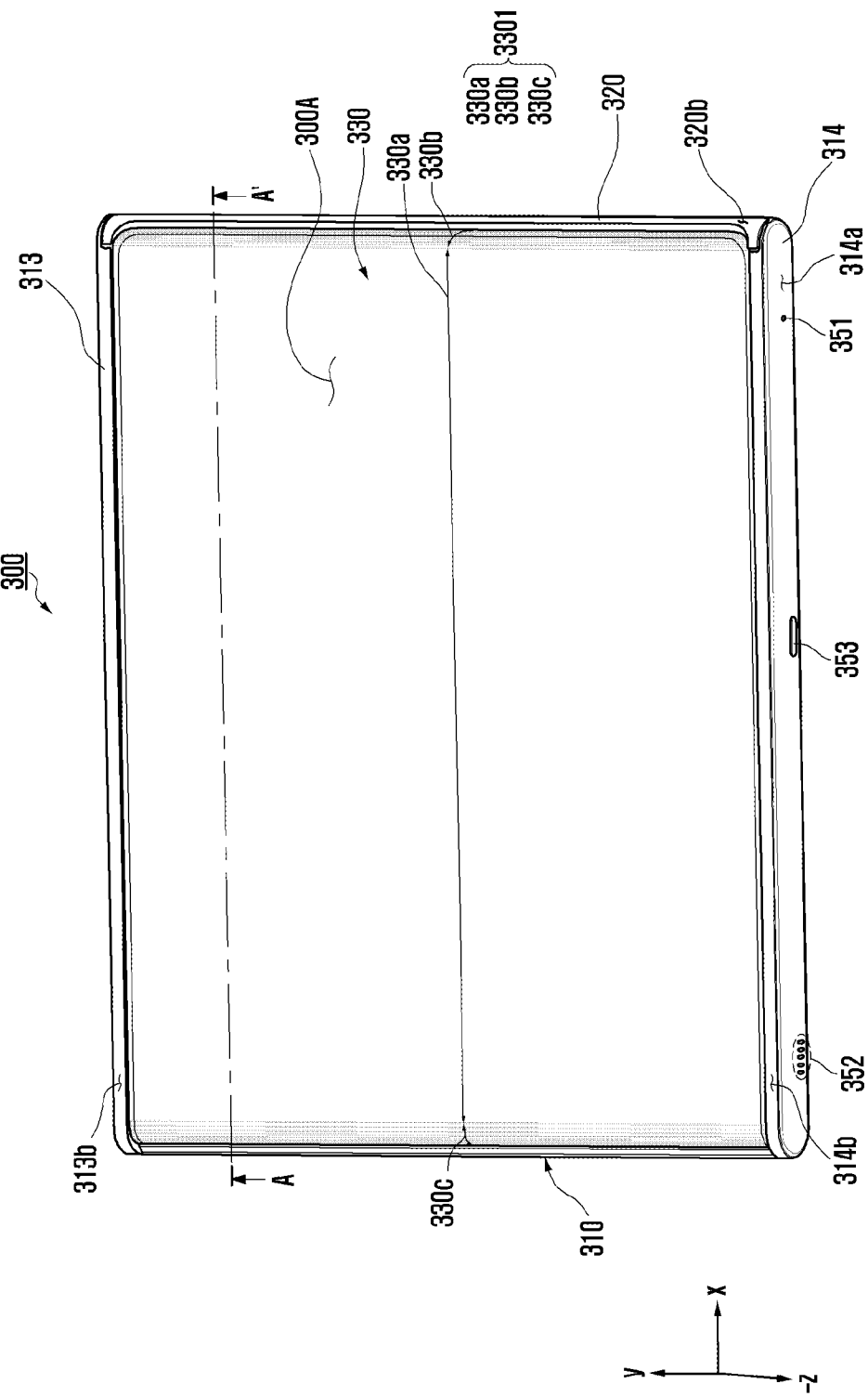
FIGS. 3A, 3B, 3C and 3D are diagrams illustrating an example structure of an expandable display of an electronic device according to various embodiments.
Figure 3B:
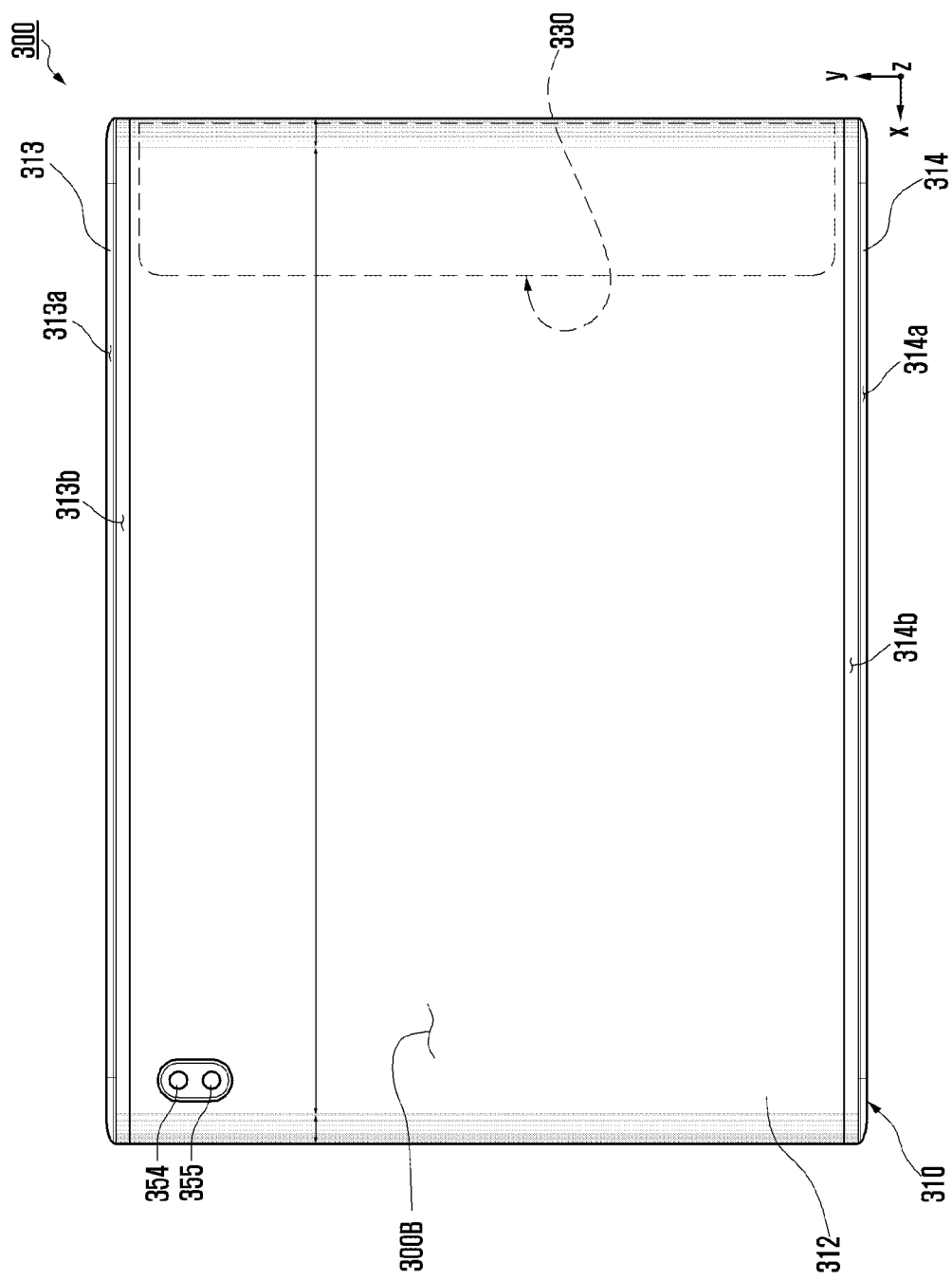
Figure 3C:
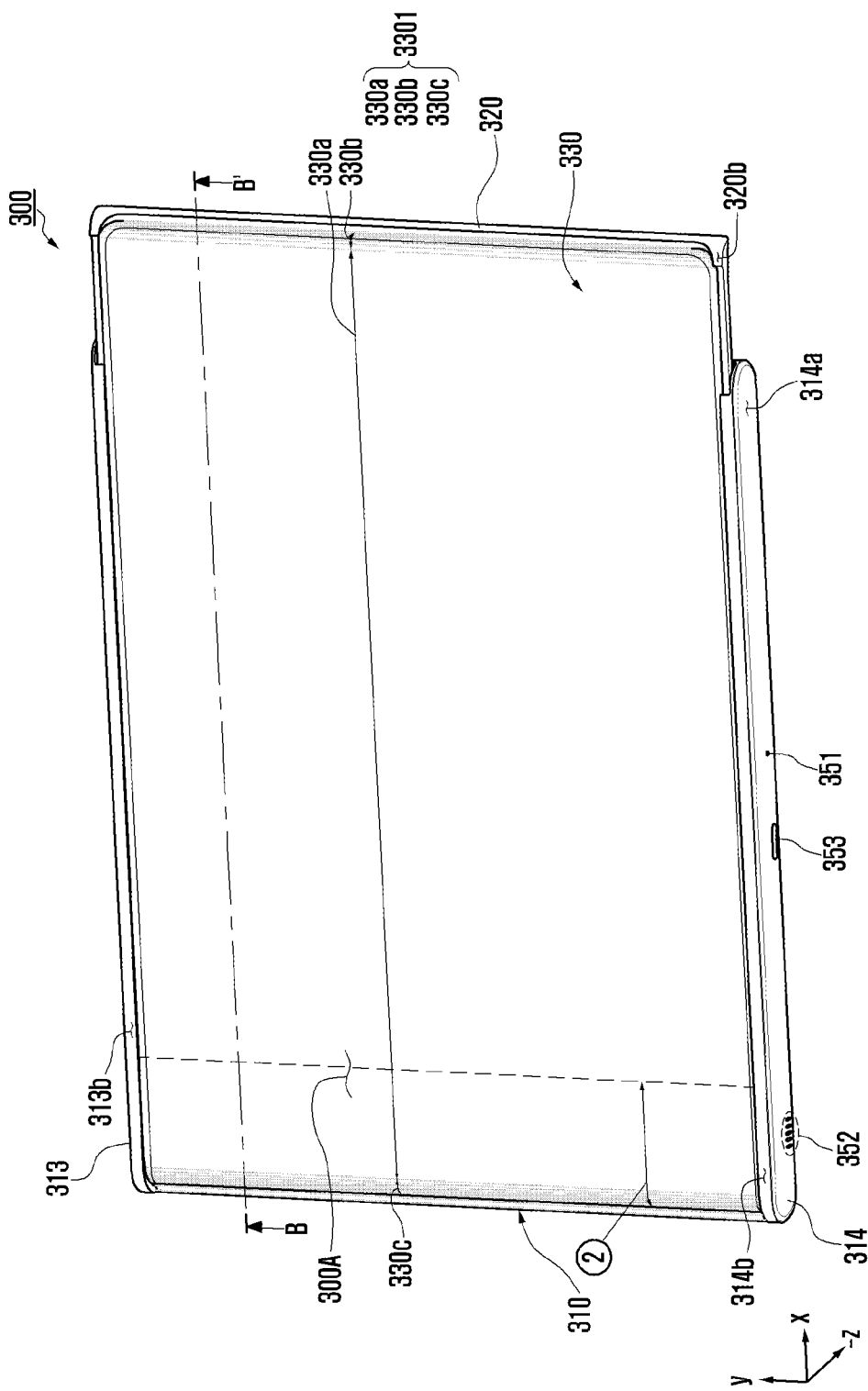
Figure 3D:
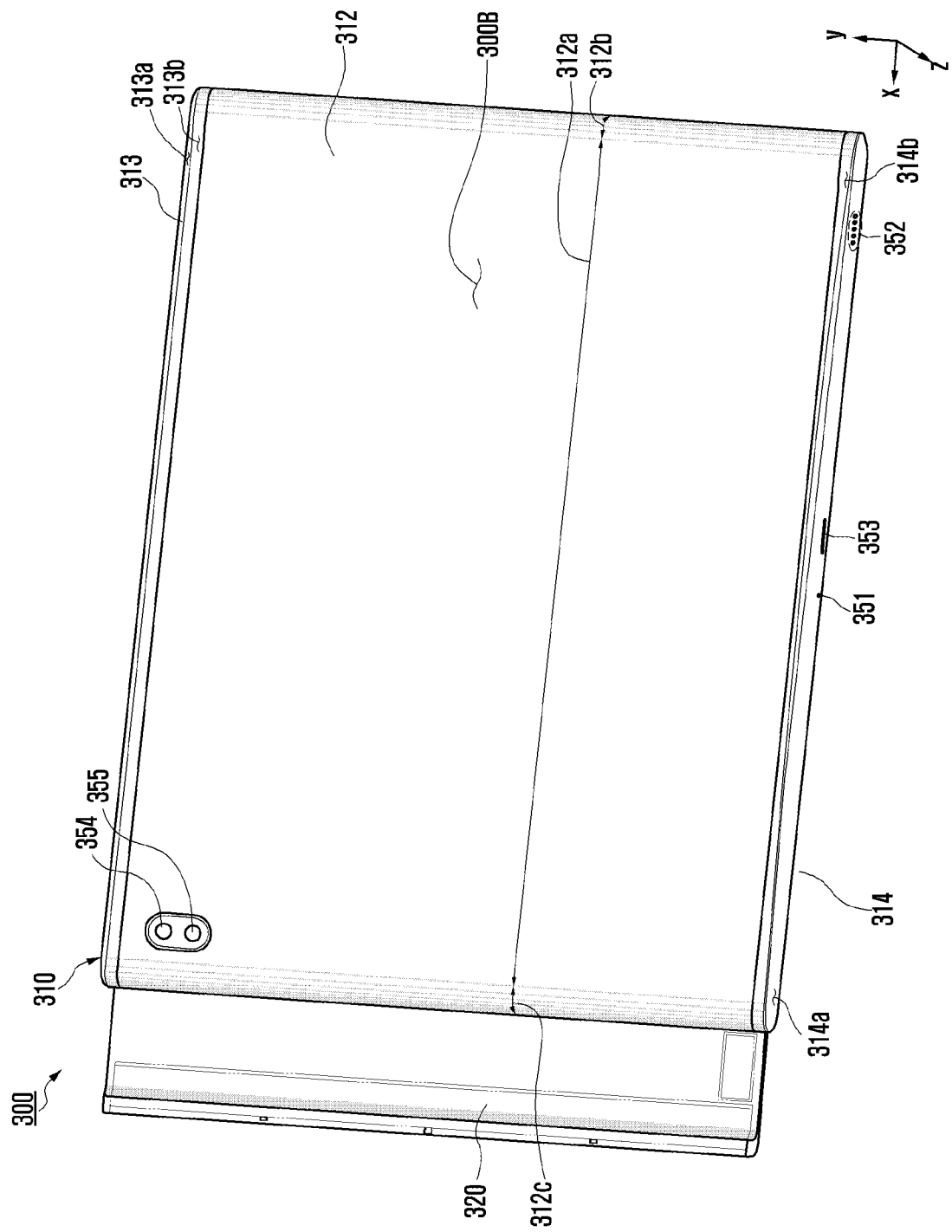

Referring to FIGS. 3A, 3B, 3C, and 3D, in an embodiment, an electronic device 300 may be implemented to expand a screen 3301 in a sliding type. For example, the screen 3301 (or a main display area) may be an area of a flexible display 330, which is visible to the outside. FIGS. 3A and 3B illustrate the electronic device 300 in the state (e.g., a slide-in state) where the screen 3301 is not expanded (or hidden in a housing), and FIGS. 3C and 3D illustrate the electronic device 300 in the state (e.g., a slide-out state) where the screen 3301 is expanded (or exposed to outside). The state in which the screen 3301 is not expanded indicates the state in which a sliding plate 320 for a sliding motion of the display 330 is not in a slide-out state and may be referred to as a closed state hereinafter. The state in which the screen 3301 is expanded indicates the state in which the screen 3301 is maximally expanded by sliding-out of the sliding plate 320 so that the screen 3301 is no longer expanded, and may be referred to as an open state hereinafter. For example, sliding out may indicate at least partial movement of the sliding plate 320 in a first direction (e.g., the +x-axis direction) when the electronic device 300 switches from the closed state to the open state. According to various embodiments, the open state may be defined as a state in which the screen 3301 is expanded compared to the closed state and may provide screens of various sizes depending on the movement position of the sliding plate 320. According to various embodiments, an intermediated state may indicate a state between the closed state in FIG. 3A and the open state in FIG. 3C. The screen 3301 may include an active area of the flexible display 330 that is visually exposed and capable of outputting images, and the electronic device 300 may adjust the active area according to the movement of the sliding plate 320 or the movement of the flexible display 330. In the following description, the open state may indicate a state in which the screen 3301 is maximally expanded. In various embodiments, the flexible display 330 that is disposed to slide in the electronic device 300 in FIG. 3A and provides the screen 3301 may be referred to as a "slide-out display" or an "expandable display. According to various embodiments, the electronic device 300 including the flexible display 330 may include the electronic device 101 shown in FIG. 1.

According to an embodiment, the electronic device 300 may include a sliding structure related to the flexible display 330. For example, if the flexible display 330 moves a configured distance by an external force, it may switch from the closed state to the open state or from the open state to the closed state without any further external force due to an elastic structure included in the sliding structure (e.g., semi-automatic sliding operation).

According to an embodiment, if a signal is generated through an input device included in the electronic device 300, the electronic device 300 may switch from the closed state to the open state or from the open state to the closed state due to a driving device such as a motor connected to the flexible display 330. For example, if a signal is generated through a hardware button or a software button provided through a screen, the electronic device 300 may switch from the closed state to the open state or from the open state to the closed state.

According to various embodiments, if signals are generated from various sensors such as a pressure sensor, the electronic device 300 may switch from the closed state to the open state or from the open state to the closed state. For example, a sensor may detect a squeeze gesture in which a part of the hand (e.g., the palm or a finger) presses a specified section of the electronic device 300 when carrying or holding the electronic device 300 by hand, and in response thereto, the electronic device 300 may switch from the closed state to the open state or from the open state to the closed state.

According to an embodiment, the display 330 may include a second section ② (see FIG. 3C). The second section ② may include a portion of the screen 3301 expanded when the electronic device 300 switches from the closed state to the open state. When the electronic device 300 switches from the closed state to the open state, the second section ② may slide out of the internal space of the electronic device 300, so that the screen 3301 may be expanded. When the electronic device 300 switches from the open state to the closed state, at least a portion of the second section ② may slide into the internal space of the electronic device 300, so that the screen 3301 may be reduced. When the electronic device 300 switches from the open state to the closed state, at least a portion of the second section ② may move into the inner space of the electronic device 300 while being bent. For example, the flexible display 330 may include a flexible substrate (e.g., a plastic substrate) formed of a polymer material including polyimide (PI) or polyester (PET). The second section ② is a portion to be bent in the flexible display 330 when the electronic device 300 switches between the open state and the closed state and may be referred to as, for example, a bendable section. In the following description, the second section ② will be referred to as a bendable section.

According to an embodiment, the electronic device 300 may include a housing 310, a sliding plate 320, or a flexible display 330.

The housing (or case) 310 may include, for example, a back cover 312, a first side cover 313, or a second side cover 314. The back cover 312, the first side cover 313, or the second side cover 314 may be connected to a support member (not shown) positioned inside the electronic device 300 and may form at least part of the appearance of the electronic device 300.

The back cover 312 may form, for example, at least a portion of a rear surface 300B of the electronic device 300. In an embodiment, the back cover 312 may be substantially opaque. For example, the back cover 312 may be formed of coated or tinted glass, ceramic, polymer, metal (e.g., aluminum, stainless steel (STS), or magnesium), or a combination of at least two of the above materials. According to various embodiments, at least a portion of the bendable section ② may be disposed to be visible from the outside through the back cover 312 in the state in which the bendable section ② of the flexible display 330 is received inside the inner space of the housing 310 (e.g., the closed state). In this case, the back cover 312 may be formed of a transparent material and/or a translucent material.

According to an embodiment, the back cover 312 may include a flat portion 313a and curved portions 313b and 212c disposed on opposite sides of the flat portion 313a interposed therebetween. The curved portions 313b and 212c may be formed adjacent to relatively long edges (not shown) of the back cover 312, respectively, on both sides thereof and may be bent toward the screen located on the opposite side of the back cover 312 to extend seamlessly. According to various embodiments, the back cover 312 may include one of the curved portions 313b and 212c or may be implemented without the curved portions 313b and 212c.

According to an embodiment, the first side cover 313 and the second side cover 314 may be positioned on opposite sides to each other. For example, the first side cover 313 and the second side cover 314 may be positioned on opposite sides of the flexible display 330 interposed therebetween in a second direction (e.g., the y-axis direction) perpendicular to the first direction (e.g., the +x-axis direction) of sliding-out of the sliding plate 320. The first side cover 313 may form at least a portion of the first side surface 313c of the electronic device 300, and the second side cover 314 may form at least a portion of the second side surface 314a of the device 300 facing in the opposite direction of the first side surface 313c. The first side cover 313 may include a first rim 313d extending from the edge of the first side surface 313c. For example, the first rim 313d may form at least a portion of a bezel on one side of the electronic device 300. The second side cover 314 may include a second rim 314b extending from the edge of the second side surface 314a. For example, the second rim 314b may form at least a portion of a bezel on the other side of the electronic device 300. According to an embodiment, in the closed state shown in FIG. 3A, the surface of the first rim 313d, the surface of the second rim 314b, and the surface of the sliding plate 320 are smoothly connected to form a curved portion (not shown) on one side corresponding to the first curved portion 330b of the screen 3301. According to various embodiments, the surface of the first rim 313d or the surface of the second rim 314b may include a curved portion (not shown) on the other side corresponding to the second curved portion 330c of the screen 3301 positioned on the opposite side of the first curved portion 330b.

According to an embodiment, the sliding plate 320 may perform a sliding movement on a support member (not shown) positioned inside the electronic device 300. At least a portion of the flexible display 330 may be disposed on the sliding plate 320, and the closed state in FIG. 3A or the open state in FIG. 3C may be formed based on the position of the sliding plate 320 on the support member. According to an embodiment, the flexible display 330 may be attached to the sliding plate 120 through an adhesive member (not shown). According to an embodiment, the adhesive member may include a heat-reactive adhesive member, a photo-reactive adhesive member, a general adhesive, and/or a double-sided tape. According to various embodiments, the flexible display 330 may be inserted into a recess formed in the sliding plate 320 by sliding to be disposed and fixed to the sliding plate 320. The sliding plate 330 may serve to support at least a portion of the flexible display 330 and may be referred to as a display support structure in various embodiments.

According to an embodiment, the sliding plate 320 may include a third rim 320b forming an outer surface of the electronic device 300 (e.g., a surface exposed to the outside to form the exterior of the electronic device 300). For example, the third rim 320*b* may form a bezel around the screen together with the first rim 313*d* and the second rim 314*b* in the closed state shown in FIG. 3A. The third rim 320*b* may extend in a second direction (e.g., the y-axis direction) to connect one end of the first side cover 313 and one end of the second side cover 314 in the closed state. For example, the surface of the third rim 320*b* may be smoothly connected to the surface of the first rim 313*d* and/or the surface of the second rim 314*b* in the closed state shown in FIG. 3A, According to an embodiment, due to sliding-out of the sliding plate 320, at least a portion of the bendable section ② may come out from the inside of the electronic device 300 to provide the state (e.g., the open state) in which the screen 3301 is expanded as shown in FIG. 3C.

According to an embodiment, in the closed state shown in FIG. 3A, the screen 3301 may include a flat portion 330*a*, and a first curved portion 330*b* and/or a second curved portion 330*c* positioned on the opposite sides of the flat portion 330*a* interposed therebetween. For example, the first curved portion 330*b* and the second curved portion 330*c* may be substantially symmetrical with respect to the flat portion 330*a* interposed therebetween. For example, in the closed state shown in FIG. 3A, the first curved portion 330*b* and/or the second curved portion 330*c* may be positioned to correspond to the curved portions 313*b* and 212*c* of the back cover 312, respectively, and may be curved toward the back cover 312. When switching from the closed state shown in FIG. 3A to the open state shown in FIG. 3C, the flat portion 330*a* may be extended. For example, a partial area of the bendable section ② forming the second curved portion 330*c* in the closed state shown in FIG. 3A may be included in the flat portion 330*a* that is extended when switching from the closed state of FIG. 3A to the open state of FIG. 3C, and may be formed as another area of the bendable section ②.

According to an embodiment, the electronic device 300 may include an opening (not shown) for sliding-in or sliding-out of the bendable section ② and/or a pulley (not shown) positioned in the opening. The pulley may be positioned corresponding to the bendable section ②, and the movement of the bendable section ② and the movement direction thereof may be guided through the rotation of the pulley in switching between the closed state of FIG. 3A and the open state of FIG. 3C. The first curved portion 330*b* may be formed to correspond to the curved surface formed on one surface of the sliding plate 320. The second curved portion 330*c* may be formed by a portion corresponding to the curved surface of the pulley in the bendable section ②. The first curved portion 330*c* may be positioned on the opposite side of the second curved portion 330*b* in the closed state or open state of the electronic device 300, thereby improving the aesthetics of the screen 3301. According to various embodiments, the flat portion 330*a* may be implemented in an extended form without the first curved portion 330*b*.

According to an embodiment, the flexible display 330 may further include a touch sensing circuit (e.g., a touch sensor). According to various embodiments (not shown), the flexible display 330 may be combined with or disposed adjacent to a pressure sensor capable of measuring the intensity (pressure) of a touch and/or a digitizer that detects a magnetic-field type pen input device (e.g., a stylus pen). For example, the digitizer may include a coil member disposed on a dielectric substrate so as to detect a resonant frequency in an electromagnetic induction method applied from a pen input device.

According to an embodiment, the electronic device 300 may include a microphone hole 351 (e.g., the input module 150 in FIG. 1), a speaker hole 352 (e.g., the sound output module 155 in FIG. 1), a connector hole 353 (e.g., the connection terminal 178 in FIG. 1), a camera module 354 (e.g., the camera module 180 in FIG. 1), or a flash 355. According to various embodiments, the flash 355 may be implemented to be included in the camera module 354. In various embodiments, the electronic device 300 may exclude at least one of the elements or further include other elements.

The microphone hole 351 may be formed in at least a portion of the second side surface 314*a* to correspond to, for example, a microphone (not shown) positioned inside the electronic device 300. The position of the microphone hole 351 is not limited to the embodiment in FIG. 3A and may vary. According to various embodiments, the electronic device 300 may include a plurality of microphones capable of detecting the direction of sound.

The speaker hole 352 may be formed in at least a portion of the second side surface 314*a* to correspond to, for example, a speaker positioned inside the electronic device 300. The position of the speaker hole 352 is not limited to the embodiment in FIG. 3A and may vary. According to various embodiments, the electronic device 300 may include a receiver hole for calls. In various embodiments, the microphone hole 351 and the speaker hole 352 may be implemented as a single hole, or the speaker hole 352 may be omitted as in a piezo speaker.

The connector hole 353 may be formed in at least a portion of the second side surface 314*a* to correspond to, for example, a connector (e.g., a USB connector) positioned inside the electronic device 300. The electronic device 300 may transmit and/or receive power and/or data to and/or from an external electronic device electrically connected to the connector through the connector hole 353. The position of the connector hole 353 is not limited to the embodiment in FIG. 3A and may vary.

The camera module 354 and the flash 355 may be positioned, for example, on the rear surface 300B of the electronic device 300. The camera module 154 may include one or more lenses, an image sensor, and/or an image signal processor. The flash 355 may include, for example, a light-emitting diode or a xenon lamp. In various embodiments, two or more lenses (an infrared camera or wide-angle and telephoto lenses) and image sensors may be positioned on one side of electronic device 300. According to various embodiments, the electronic device 300, not limited to the embodiment in FIG. 3B or 3D, may include a plurality of camera modules. The camera module 354 may be one of a plurality of camera modules. For example, the electronic device 300 may include a plurality of camera modules (e.g., a dual camera or a triple camera) having different properties (e.g., angle of view) or functions from each other. For example, a plurality of camera modules (e.g., the camera module 354) including lenses having different angles of view may be provide, and the electronic device 300, based on a user's selection, may perform control to change the angle of view of the camera module executed in the electronic device 300. In addition, the plurality of camera modules may include at least one of a wide-angle camera, a telephoto camera, a color camera, a monochrome camera, or an infrared (IR) camera (e.g., a time-of-flight (TOF) camera or a structured light camera). According to an embodiment, the IR camera may operate as at least a part of a sensor module (not shown).

According to various embodiments (not shown), the electronic device 300 may further include a camera module (e.g., a front camera) for generating an image signal, based on light received through one surface (e.g., the front surface 300A) of the electronic device 300, which placed in a direction in which the screen 3301 is directed. For example, the camera module 354 is not limited to the embodiment in FIG. 3B or 3D and may be positioned inside the housing 310 while being aligned with an opening (e.g., a through hole or a notch) formed in the flexible display 330. The camera module 354 may receive light through the opening and a partial area of the transparent cover overlapping the opening to generate an image signal. The transparent cover may serve to protect the flexible display 330 from the outside and include, for example, a material such as polyimide or ultra-thin glass (UTG).

According to various embodiments, not limited to the embodiment in FIG. 3B or 3D, the camera module 355 may be disposed at the lower end of at least a portion of the screen 3301 of the flexible display 330, and related functions (e.g., photographing images) may be performed while the position of the camera module 354 is not visually recognized (or exposed). In this case, for example, when viewed from the top of the screen 3301 (e.g., when viewed in the −z-axis direction), the camera module 354 may be disposed to overlap at least a portion of the screen 3301 so as not to be exposed to the outside and obtain an image of an external subject.

According to various embodiments (not shown), the electronic device 300 may further include a key input device (e.g., the input module 150 in FIG. 1). The key input device may be positioned, for example, on the first side surface 313c of the electronic device 300 formed by the first side cover 313. In various embodiments (not shown), the key input device may include at least one sensor module.

According to various embodiments (not shown), the electronic device 300 may include various sensor modules (e.g., the sensor module 176 in FIG. 1). The sensor module may generate electrical signals or data values corresponding to an internal operation state of the electronic device 300 or an external environmental state. For example (not shown), the sensor module may include proximity sensor that generates a signal related to the proximity of an external object, based on light received through the front surface 300A of the electronic device 300, which is placed in the direction in which the screen 3301 faces. As another example (not shown), the sensor module may include various biometric sensors such as a fingerprint sensor or an HRM sensor for detecting information about a living body, based on light received through the front surface 300A or the rear surface 300B of the electronic device 300. The electronic device 300 may include at least one of various other sensor modules, such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

According to various embodiments, not limited to the embodiments in FIGS. 3A, 3B, 3C, and 3C, the electronic device 300 may also be implemented in the structure in which the screen is extended from the third rim 320b when the sliding plate 320 slides out. For example, a partial area of the flexible display 330 forming the first curved portion 330b in the closed state shown in FIG. 3A may be included in the flat portion 330a that is extended when switching from the closed state of FIG. 3A to the open state of FIG. 3C, and may be formed as another area of the flexible display 330.

FIGS. 4A, 4B, 4C and 4E are diagrams illustrating example structures of an expandable display of an electronic device according to various embodiments.

According to various embodiments, an electronic device may include a display having a substantially rectangular shape, and the display may be expanded in at least one of up, down, left, and right directions (e.g., the flexible display 330 in FIGS. 3A to 3D). For example, in the state where the display is not expanded, a partial area thereof may be received inside a housing through a rolling structure, and the received partial area may slide out to be exposed to the outside by rotation of the rolling structure due to a user's manipulation or a motor.

According to various embodiments, an electronic device may include a display that is expandable in a left or right direction.

Figure 4A:
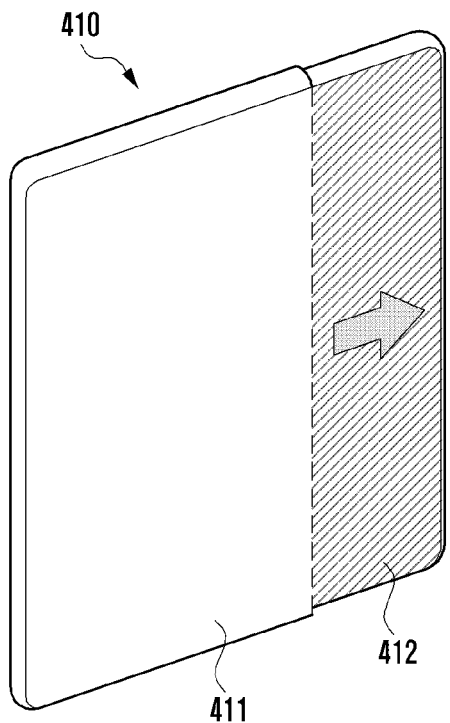
FIGS. 4A, 4B, 4C, 4D and 4E are perspective views illustrating example structures of an expandable display of an electronic device according to various embodiments.
Figure 4A:
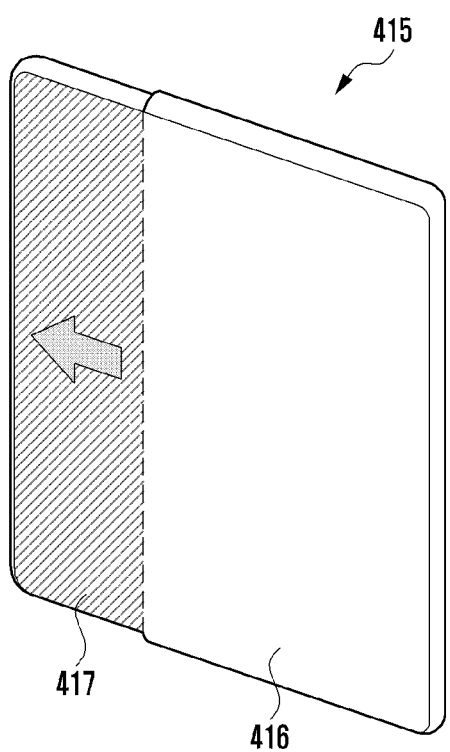

Referring to FIG. 4A, the electronic device may include a display 410 expandable to the left. For example, the electronic device may display a screen through a main display area 411 in the state in which the display 410 is not expanded, and the expandable display area 412 may be received inside a housing to be in an inactive state. If the expandable display area 412 slides out to the left to be exposed to the outside by user's manipulation, the expandable display area 412 may be activated so that a screen may be displayed in the main display area 411 and the expandable display area 412.

According to an embodiment, a display 415 of the electronic device may include a main display area 416 that displays a screen in an unexpanded state and an expandable display area 417 that is expandable to the right and displays a screen in an expanded state.

According to various embodiments, the electronic device may include a display that is expandable in an upward or downward direction.

Figure 4B:
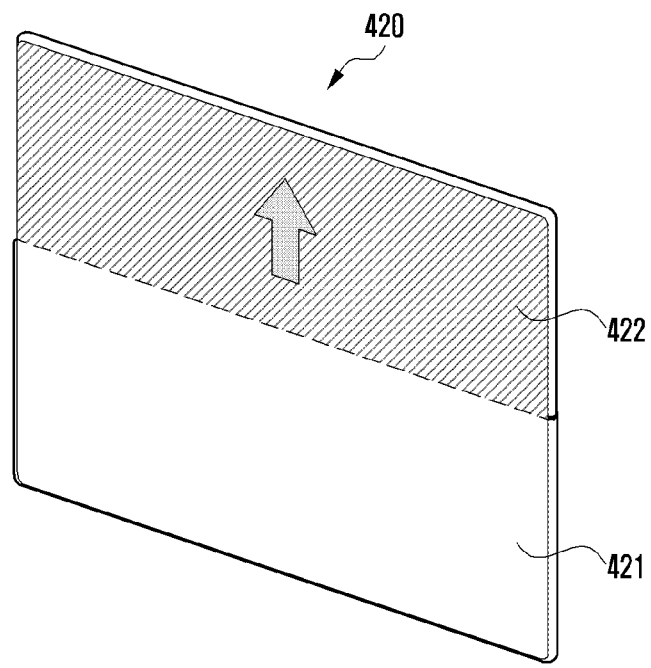
Figure 4B:
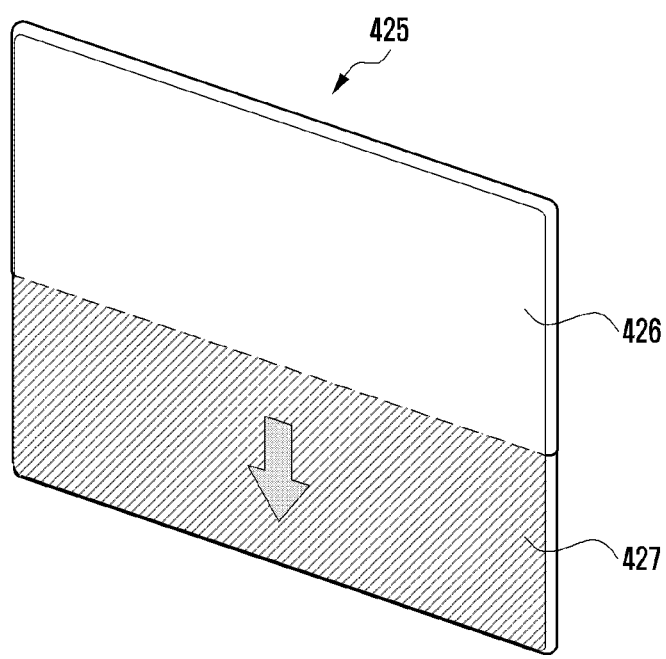

Referring to FIG. 4B, a display 420 of the electronic device may include a main display area 421 that displays a screen in an unexpanded state and an expandable display area 422 that is expandable upwards and displays a screen in an expanded state. According to an embodiment, the display 425 of the electronic device may include a main display area 426 that displays a screen in an unexpanded state and an expandable display area 427 that is expandable downwards and displays a screen in an expanded state.

According to various embodiments, the electronic device may include a display that is expandable in both left and right directions or in both upward and downward directions.

Figure 4C:
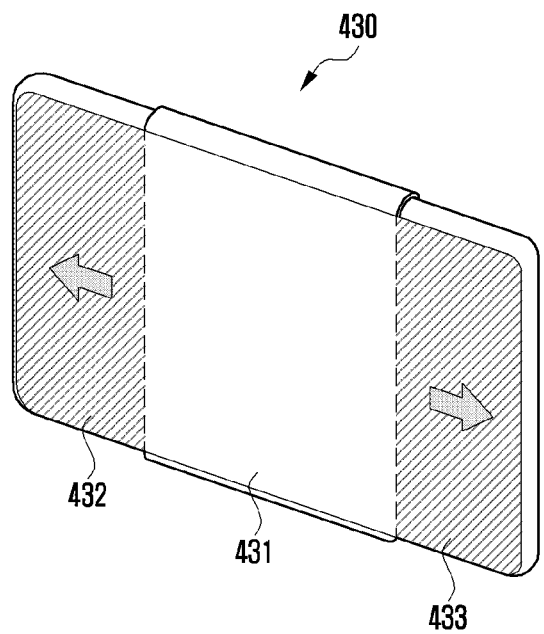
Figure 4C:
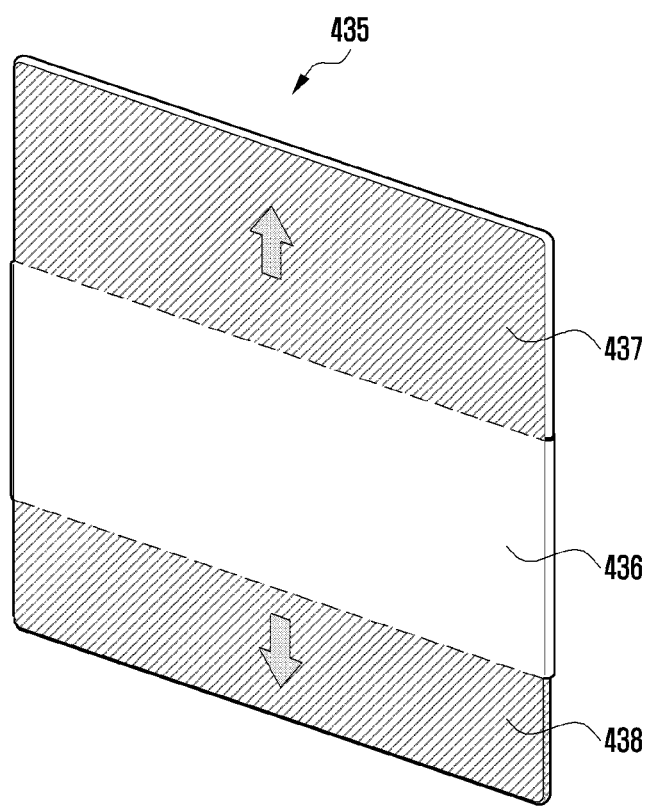

Referring to FIG. 4C, a display 430 of the electronic device may include a main display area 431 that displays a screen in an unexpanded state, a first expandable display area 432 that is expandable to the left and displays a screen in an expanded state, and a second expandable display area 433 that is expandable to the right and displays a screen in an expanded state. In this case, at least one of the first expandable display area 432 and the second expandable display area 433 may be extended depending on the user's manipulation and the type of output content.

According to an embodiment, a display 435 of the electronic device may include a main display area 436 that displays a screen in an unexpanded state, a first expandable display area 437 that is expandable upwards and displays a screen in an expanded state, and a second expandable display area 438 that is expandable downwards and displays a screen in an expanded state.

According to various embodiments, the electronic device may include a display that is expandable both in an upward direction (or a downward direction) and in a right direction (or a left direction).

Figure 4D:
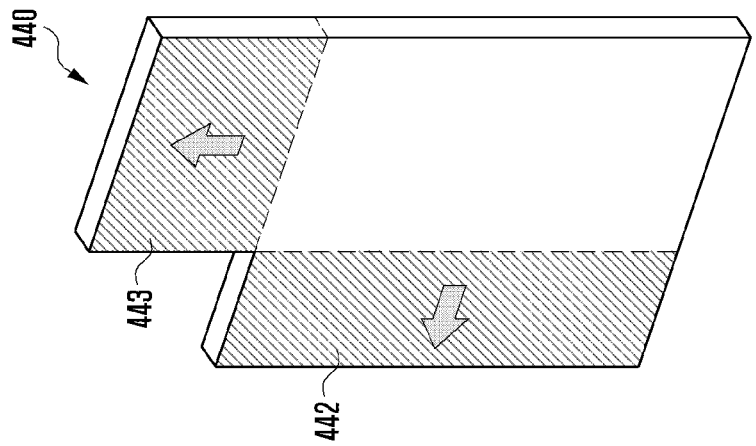
Figure 4D:
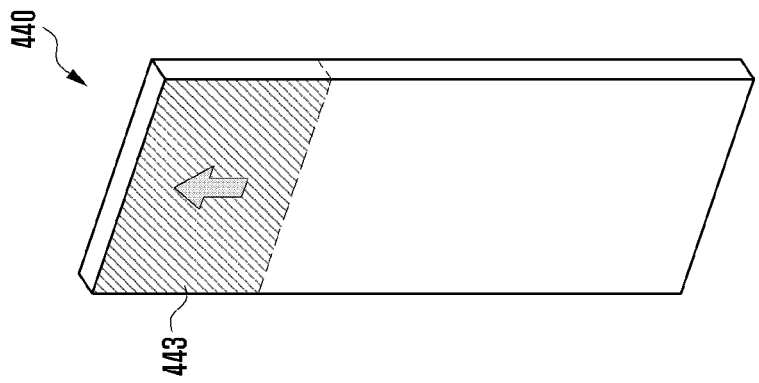
Figure 4D:
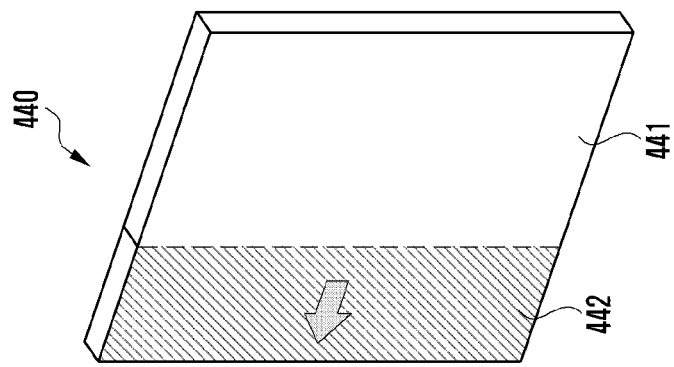

Referring to FIG. 4D, a display 440 of the electronic device may include a main display area 441 that displays a screen in an unexpanded state, a first expandable display area 442 that is expandable to the left and displays a screen in an expanded state, and a second expandable display area 443 that is expandable upwards and displays a screen in an expanded state. In this case, at least one of the first expandable display area 442 and the second expandable display area 443 may be configured as a display separate from the main display area 441, and at least one of the first expandable display area 442 and the second expandable display area 443 may be extended depending on the user's manipulation and the type of output content.

According to various embodiments, only a portion of the display of the electronic device may be extended.

Figure 4E:
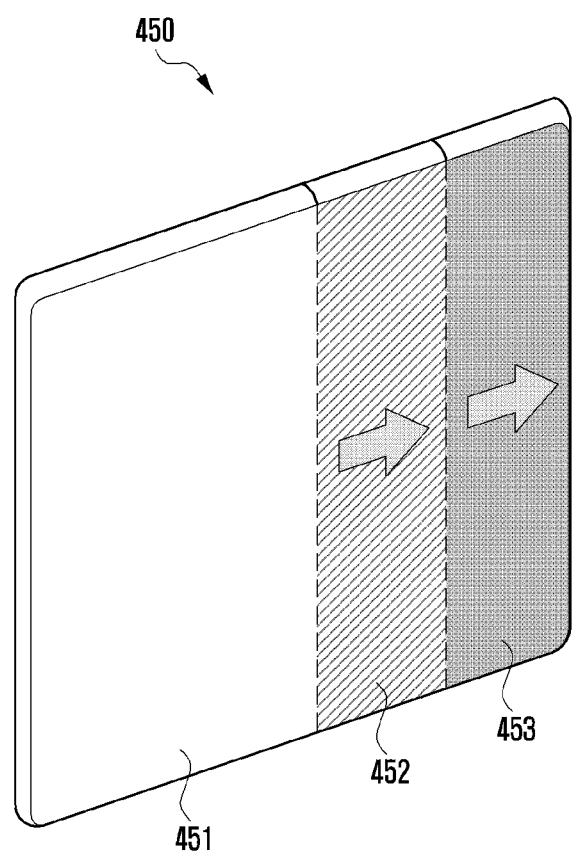

Referring to FIG. 4E, the display area 451 of the display 450 may be expanded to the left, and if a partial area 453 is extended, only the corresponding area may be activated to display a screen, and if another partial area is further extended 452, all of the extended areas may be activated to display a screen.

According to an embodiment, the display may be expanded in multiple stages. For example, if the display is expanded by a first area, it may be fixed through a support structure and expanded by a second area by additional force.

An electronic device according to various embodiments described below may include a display having at least one of the structures shown in FIGS. 4A to 4E and include various types of expandable displays other than those described with reference to FIGS. 4A to 4E.

Figure 5:
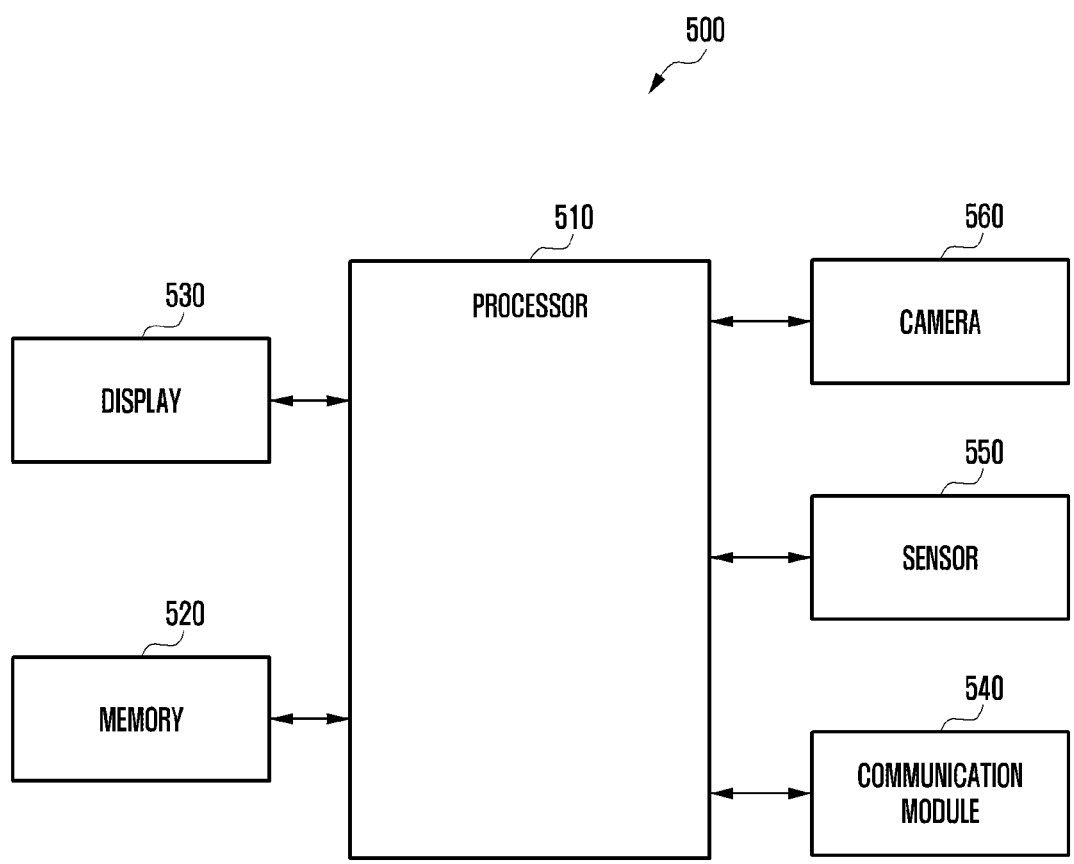
FIG. 5 is a block diagram illustrating an example configuration of an electronic device according to various embodiments.

FIG. 5 is a block diagram illustrating an example configuration of an electronic device according to various embodiments.

Referring to FIG. 5, an electronic device 500 may include a processor (e.g., including processing circuitry) 510, a memory 520, a display 530, a communication module (e.g., including communication circuitry) 540, a sensor 550, and a camera 560. Various embodiments of the disclosure may be implemented even if at least some of the illustrated elements are omitted and/or replaced. The electronic device 500 may further include at least some of the configurations and/or functions of the electronic device 101 in FIG. 1.

Some (e.g., the processor 510, the memory 520, and the communication module 540) of the elements shown in FIG. 5 and/or other elements of the electronic device 500 not shown therein may be disposed inside the housing (not shown) of the electronic device 500, and at least a part of some elements (e.g., the display 530) may be exposed to the outside of the housing.

According to various embodiments, the display 530 may display content provided from the processor 510. For example, the display 530 may display main content (or first content) produced by an application executed through the processor 510 and/or shared content (or second content) obtained from an external device through the communication module 540.

According to various embodiments, the display 530 may include a main display area (e.g., the main display area 411 in FIG. 4A) and at least one expandable display area (e.g., the expandable display area 412 in FIG. 4A). The display 530 may include at least one expandable display area that is expandable from the main display area in at least one of the upward, downward, left, and right directions. For example, only the main display area may be exposed to the outside to output a screen when the display 530 is in a slide-in state, and the expandable display area received (or hidden) inside the housing and not exposed to the outside may be inactive so as not to output a screen. When the display 530 slides out, at least a portion of the expandable display area may be exposed to the outside, so that the expandable display area may switch to an active state to output a screen. Various types of the expandable display 530 have been previously described with reference to FIGS. 3A to 3D and 4A to 4E, but the disclosure is not limited thereto.

According to various embodiments, the display 530 may be configured as a touch screen that detects a touch and/or proximity touch (or hovering) input using a user's body part (e.g., a finger) or an input device (e.g., a stylus pen).

According to various embodiments, the electronic device 500 may include at least one sensor 550 for detecting contact or proximity. For example, the electronic device 500 may include various types of short-range sensors for detecting the proximity or contact of an object, such as near-field communication (NFC), radio frequency identification (RFID), Bluetooth (or Bluetooth low energy), or a touch sensor.

According to various embodiments, at least one sensor 550 may be disposed in an upper, lower, left, and right bezel area of the display 530 and/or corner areas of the housing. Accordingly, when selecting an area to display the main content or shared content, a touch or proximity input may be made to the sensor 550 adjacent to the area intended by the user. In various embodiments, the electronic device 500 may dispose one to five sensors 550 at positions around the display 530.

According to various embodiments, the camera 560 may be disposed in a bezel area around the display 530 or in a notch area inside the display 530, thereby photographing a surrounding subject. Image data captured by the camera 560 may be provided to the processor 510, and the processor 510 may analyze the corresponding image to determine the user's interaction position.

According to various embodiments, the communication module 540 may include various communication circuitry and provide a wired or wireless communication interface with an external device. For example, the communication module 540 may include a high-definition multimedia interface (HDMI) and a universal serial bus (USB) interface as examples of wired communication interfaces (e.g., the interface 177 in FIG. 1). In addition, the communication module 540 may include a wireless communication module (e.g., the wireless communication module 192 in FIG. 1) supporting an external device and a short-range communication module. The wireless communication module may support various short-range wireless communication schemes (e.g., Wi-Fi, Bluetooth, and Bluetooth low energy (BLE)) and include independent hardware and/or software configurations to support respective wireless communication schemes.

According to various embodiments, the memory 520 may include a volatile memory and a non-volatile memory, and temporarily or permanently store a variety of data. The memory 520 may include at least some of the configurations and/or functions of the memory 130 in FIG. 1 and may store the program 140 in FIG. 1.

The memory 520 may store various instructions that may be executed by the processor 510. These instructions may include control commands such as arithmetic and logic operations, data transfer, and input/output, which may be recognized by the processor 510.

According to various embodiments, the processor 510 may include various processing circuitry and includes a configuration capable of performing calculations or data processing related to control and/or communication of respective elements of the electronic device 500 and may be configured as one or more processors 510. The processor 510 may include at least some of the configurations and/or functions of the processor 120 in FIG. 1. The processor 510 may be operatively, functionally, and/or electrically connected to the respective elements of the electronic device 500, such as the display 530, the memory 520, the sensor 550, the camera 560, and the like.

According to various embodiments, although calculation and data processing functions that the processor 510 may perform on the electronic device 500 are not limited, hereinafter, a description will be made based on various embodiments of determining an area to display the main content and shared content on the display 530 and extending the display 530 according thereto. Operations of the processor 510 to be described below may be performed by loading instructions stored in the memory 520.

According to various embodiments, the processor 510 may display main content (or first content) on the main display area in the state (e.g., slide-in state) in which the display 530 is not expanded (or. Here, the main content may be content produced when the electronic device 500 executes an application (e.g., an Internet browser, a game, or a gallery). Alternatively, in the case where the electronic device 500 is implemented as a TV, it may be broadcast content received through terrestrial or cable channels. In the state in which the display 530 is not expanded, the expandable display area may be received (or hidden) inside the housing, and the processor 510 may perform control such that the expandable display area is in an inactive state.

According to various embodiments, the processor 510 may identify a connection with an external device for sharing content through the communication module 540 and detect activation of a video sharing function. For example, an external device may be connected through a wired interface (e.g., HDMI or USB) and may be connected through short-range wireless communication such as Wi-Fi Direct, Wi-Fi Aware, and Bluetooth.

According to various embodiments, the processor 510 may receive information related to shared content (or second content) from an external device. For example, when the electronic device 500 and an external device are connected via Miracast, content of the external device may be transmitted as it is and mirrored on the electronic device 500, and when they are connected in a desktop experience (Dex) mode, application information for implementing a UI on the electronic device 500 may be received, or link information to another external device (e.g., an external server) may be received to obtain shared content from another external device.

According to an embodiment, if the electronic device 500 displays a screen displayed on an external device by mirroring, the electronic device 500 may provide, in real time, information (e.g., chatting, SNS, real-time search, etc.) that changes in real time in the external device through an area of the expanded display 530. For example, if the electronic device 500 performs mirroring on a plurality of external devices for screens of the respective external devices, the electronic device 500 may display the screens of the respective external devices in different areas of the expanded display 530 from each other. In this case, the area where the screen of each external device is displayed on the expanded display 530 may be determined based on the position of user interaction using each external device (e.g., left NFC tagging and right NFC tagging of the display).

According to an embodiment, if the electronic device 500 receives link information from an external device and obtains shared content from another external device (e.g., an external server), the electronic device 500 may display, in real time, image information received in real time from the another external device through an area of the expanded display 530. According to the embodiment, a user may interact (e.g., left NFC tagging and right NFC tagging of the display 530) with various areas of the electronic device 500 using a single external device to transmit link information about an image, which is to be transmitted, several times, and the electronic device 500 may receive a plurality of pieces of image information in real time through the link information obtained according to each interaction and display the same in different areas. According to various embodiments, the processor 510 may determine a first area to display the main content and a second area to display the shared content in the state in which the expandable display area is expanded.

According to various embodiments, if the expandable display area is exposed to outside, the processor 510 may determine the main display area to be a first area to display the main content and determine the expandable display area to be a second area to display the shared content. In this case, the main content continues to be displayed on the same position before and after the expansion of the display 530, and the shared content may be displayed in expandable display area that is expanded in any one of the upward, downward, left, and right directions.

According to various embodiments, the processor 510 may determine the first area to display the main content and the second area to display the shared content, based on the user interaction.

According to an embodiment, the processor 510 may determine the first area and the second area, based on a touch or proximity input onto the sensor 550 disposed around the display 530 (e.g., in a corner of the housing or a bezel area). For example, the electronic device 500 may include four NFC sensors 550 on the upper, lower, left, and right sides of the display 530, and if a user's proximity is detected by a specific NFC sensor 550, the electronic device 500 may determine to display the shared content in an area corresponding to the position of the corresponding NFC sensor 550 on the expanded display 530. This embodiment will be described in more detail with reference to FIG. 8.

According to an embodiment, the processor 510 may determine the first area and the second area, based on a touch input onto the main display area. The display 530 may be configured as a touch screen, and the processor 510 may divide the main display area of the display 530 into a plurality of areas, and if a user's touch input is detected in one of the divided areas, the processor 510 may determine to display the shared content in the corresponding area. This embodiment will be described in more detail with reference to FIGS. 7A to 7C.

According to an embodiment, the processor 510 may recognize a user's gesture, based on image information obtained through the camera 560, and determine to display the shared content in an area corresponding to the user's gesture.

According to an embodiment, the processor 510 may determine the first area and the second area, based on information received from an external device. The external device may execute an application supporting a function of sharing a screen with the electronic device 500, and the application may provide a UI for determining an area where the shared content is to be displayed on the expanded display 530 of the electronic device 500. The electronic device 500 may receive information about selection on the UI of the external device and determine to display the shared content in the corresponding area. This embodiment will be described in more detail with reference to FIGS. 9A and 9B.

According to various embodiments, the processor 510 may determine an area to display the shared content, further based on a display orientation of the shared content. For example, if content displayed on an external device is mirrored on the display 530 of the electronic device 500 such as Miracast, the external device may transmit orientation information obtained through an inertial sensor (e.g., an acceleration sensor or a gyro sensor) to the electronic device 500, and the processor 510 may determine whether to display the shared content in a landscape mode or a portrait mode, based on the received orientation information. Alternatively, the processor 510 may obtain the state of a screen and content input in the application of the external device and/or a display orientation mode provided by the content, and determine the display orientation of the shared content.

According to various embodiments, if the first area to display the main content and the second area to display the shared content are determined, the processor 510 may control the expandable display area of the display 530 to be expanded. For example, the display 530 may be configured such that at least one expandable display area is expanded by a motor structure, and in this case, the processor 510 may automatically expand the expandable display area corresponding to the size of the area to display the main content and the shared content. Alternatively, the display 530 may be configured to be manually expanded by a user's force, and the processor 510 may provide information guiding the user to exposing the expandable display area to the main display area.

According to various embodiments, the processor 510 may determine a screen display type for displaying the main content and the shared content on the expanded display 530. For example, the processor 510 may determine to display content focusing on the main content such that the display area of the shared content is added to the expanded display 530 while maintaining the display area of the main content, display content such that the display area of the main content and the display area of the shared content have the same size, or display content focusing on the shared content such that the display area of the shared content is added by changing (e.g., reducing) the display area of the main content. This embodiment will be described in greater detail below with reference to FIG. 13.

According to various embodiments, if the first area to display the main content and the second area to display the shared content are determined, the processor 510 may adjust the sizes of the main content and/or the shared content. For example, if it is impossible to display the first content in the same size as the previous one even on the expanded display 530 as the second content is further displayed, the processor 510 may reduce the main content while maintaining the aspect ratio. Alternatively, the processor 510 may display only a portion of the main content by cutting out portions of the main content on the upper and lower sides or the left and right sides thereof, or change the aspect ratio (or resolution) of the main content to match the size of the determined first area.

According to various embodiments, the display 530 may include a first expandable display area that is expandable in a first direction from the main display area and a second expandable display area that is expandable in a second direction. For example, the display 530 may include a first expandable display area and a second expandable display area that are expandable to the left and right, respectively. According to various embodiments, if a position to display the shared content is determined by user interaction, the processor 510 may perform control such that an expandable display area corresponding to the position is expanded. For example, if the display 530 is expandable to the left and right and if the shared content is determined to be displayed on the left side of the main content through user interaction, the processor 510 may control a motor structure such that the left side of the display 530 is exposing to outside or display guide information guiding the user to exposing the left expandable display area.

According to various embodiments, the electronic device 500 may be connected to a plurality of external devices and display shared content shared with the plurality of external devices on the expandable display area. For example, if user interaction occurs on the left side of the display 530 for a first external device and on the right side thereof for a second external device, the processor 510 may display first shared content received from the first external device in a first expandable display area that is expanded to the left of the main display 530 and display second shared content received from the second external device in a second expandable display area that is expanded to the left side of the main display 530. On the other hand, if the electronic device 500 includes an expandable display area that is expanded only in one direction, the processor 510 may divide at least a portion of the expandable display area and the main display area and display the first shared content and the second shared content together with the main content. This embodiment will be described in detail with reference to FIG. 16.

Figure 6:
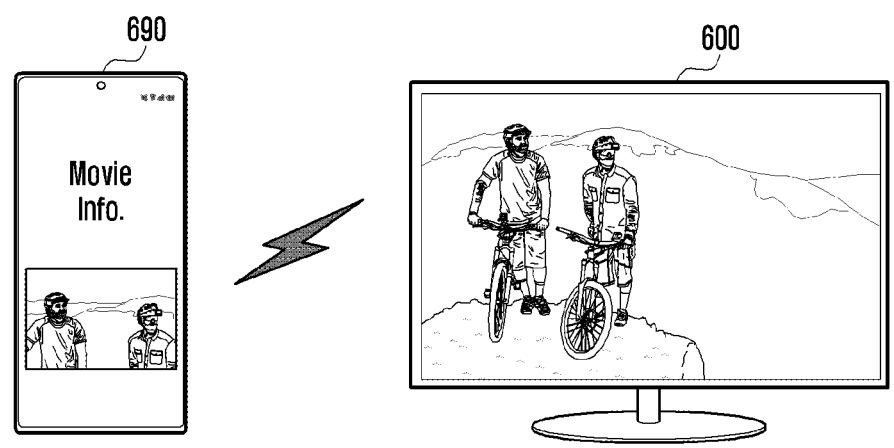
FIG. 6 is a diagram illustrating an electronic device and an external device supporting a screen sharing function according to various embodiments.

FIG. 6 is a diagram illustrating an electronic device and an external device supporting a screen sharing function according to various embodiments.

FIG. 6 shows that a user watches a movie as main content in the state (i.e., a slide-in state) in which a display of an electronic device 600 (e.g., the electronic device 500 in FIG. 5) is not expanded and, at the same time, identifies movie information from a website related to the corresponding movie through an external device 690. Referring to FIG. 6, although the external device 690 is illustrated in the form of a smartphone and the electronic device 600 is illustrated in the form of a monitor, they are not limited thereto, and the electronic device 600 may be implemented as various types of devices (e.g., the TV 230, the tablet PC 220, the smartphone 210, the laptop computer 240, and the monitor 250 in FIG. 2) having an expandable display According to various embodiments, the electronic device 600 may be connected to the external device 690 by wired or wireless communication. For example, the electronic device 600 and the external device 690 may be connected through a wired interface (e.g., HDMI or USB) or may be connected through short-range wireless communication such as Wi-Fi Direct, Wi-Fi Aware, and Bluetooth.

According to various embodiments, if a screen sharing event occurs while main content (e.g., a movie) is being displayed on the display, the electronic device 600 may determine an area to display shared content and, according to the determination, perform control such that the display is expanded or provide guide information guiding the user to expand the display.

Figure 7A:
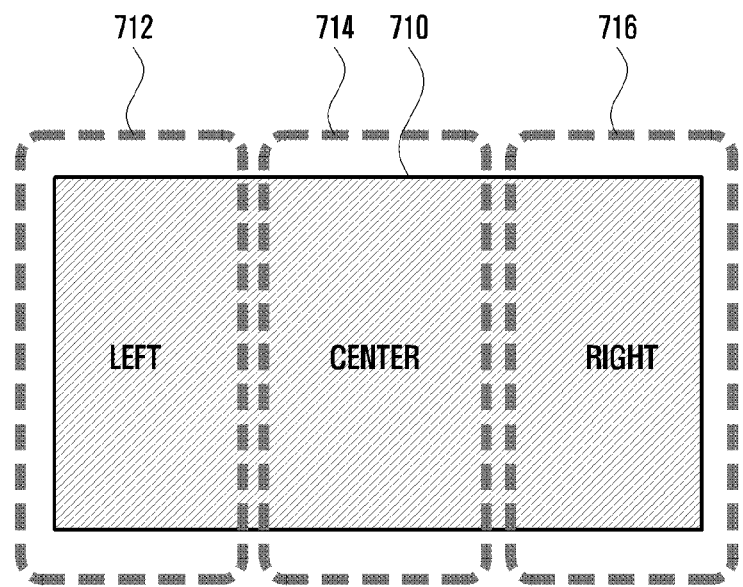
FIGS. 7A, 7B and 7C are diagrams illustrating example division of areas in which content is displayed on a display according to various embodiments.
Figure 7B:
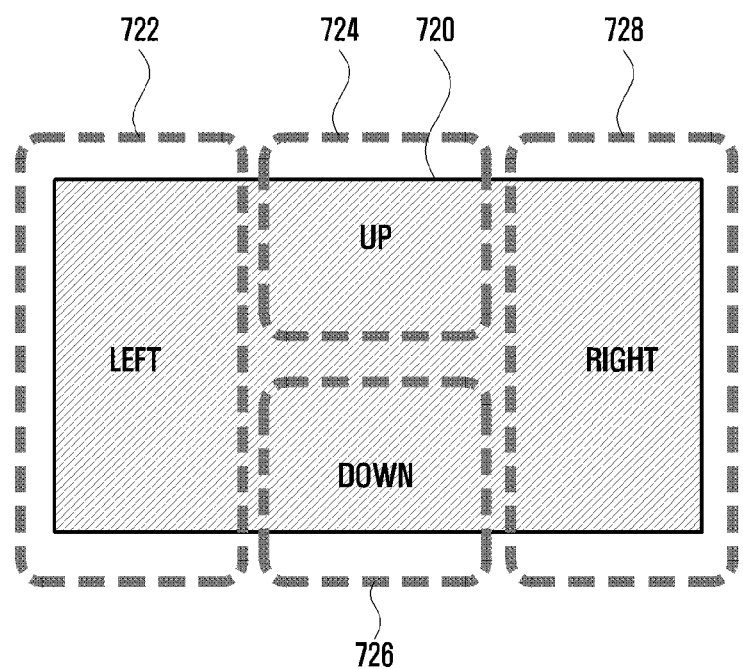
Figure 7C:
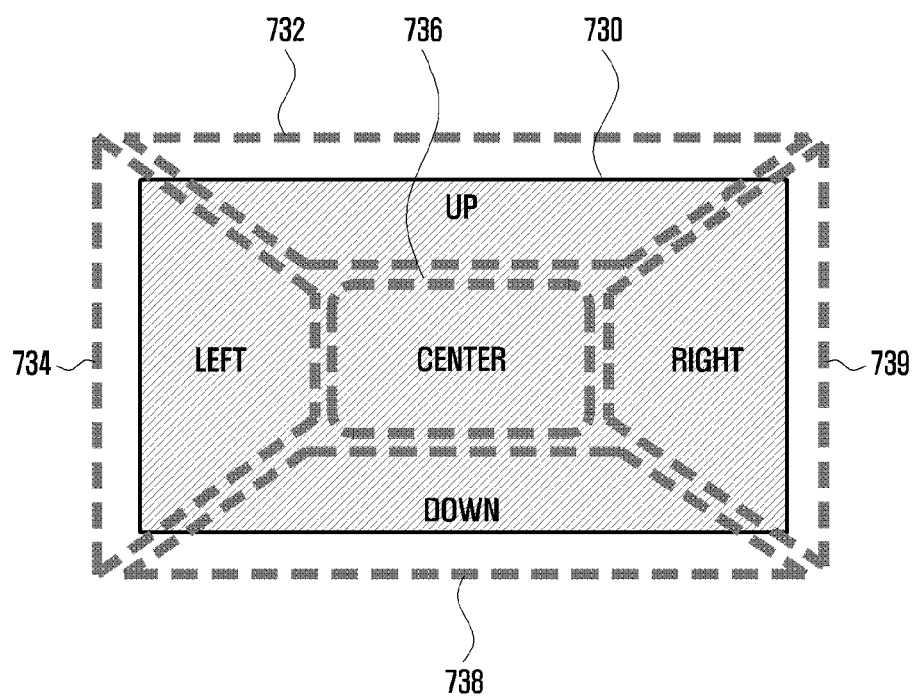

FIGS. 7A, 7B and 7C are diagrams illustrating example division of areas in which content is displayed on a display according to various embodiments.

According to various embodiments, an electronic device (e.g., the processor in FIG. 5) may determine a first area to display main content and a second area to display shared content, based on a touch input onto the main display area and/or an input to a sensor disposed on the side surface of the display. For example, if the main display area of the display is divided into a plurality of areas and if a user's touch input is detected in any one of the divided areas, it may be determined to display shared content in the corresponding area. Here, a method of dividing the area of the main display may be various.

For example, referring to FIG. 7A, a main display area 710 may be divided into three areas on a center 714, a left side 712, and a right side 716. If screen sharing is started and if a user interaction with the left area 712 (e.g., a touch input to the left area 712 of the main display or a proximity input to a sensor disposed on the left side) is detected, the electronic device may determine to display the shared content in the left area in the state (i.e., a slide-out state) in which the display is expanded (e.g., the expandable display area expanded to the left). In this case, the electronic device may control the expandable display area that is automatically expanded to the left to slide out by a motor structure or display information guiding the user to expand the expandable display area to the left on the display. Thereafter, if extension of the display is completed, the previously displayed main content may continue to be displayed on the main display area, and the shared content received from an external device may be displayed on the expandable display area.

In the example shown in FIG. 7A, if a user interaction occurs in the right area 716 in the case where the display is expandable only to the left, the electronic device may display, in the state in which the display is expanded, the shared content on a partial area of the right side of the main display area and may move and display the main content to and on the rest of the main display area and the expandable display area expanded to the left.

According to an embodiment, as shown in FIG. 7B, a main display area 720 may be divided into four areas on a left side 722, a right side 728, an upper side 724, and a lower side 726, and in this case, the shared content may also be displayed at a position corresponding to an area where a user interaction occurs as in the embodiment in FIG. 7A.

According to an embodiment, as shown in FIG. 7C, a main display area 730 may be divided into five areas on a left side 734, a right side 739, an upper side 732, a lower side 738, and a center 736, and in this case, the shared content may be displayed at a position corresponding to an area where a user interaction occurs as in the embodiment in FIG. 7A.

Figure 8:
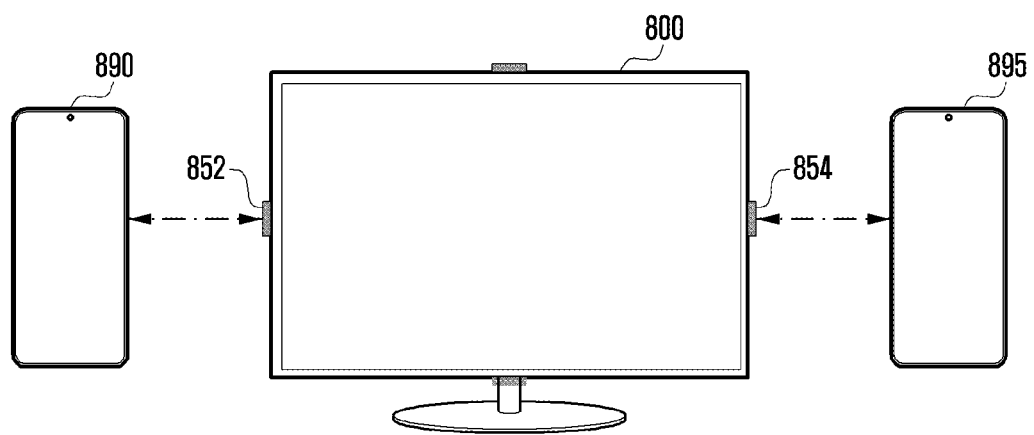
FIG. 8 is a diagram illustrating a sensor for selecting an area of an electronic device according to various embodiments.

FIG. 8 is a diagram illustrating a sensor for selecting an area of an electronic device according to various embodiments.

According to various embodiments, the electronic device 800 may include one or more sensors 852 and 854 disposed around a display (e.g., a corner of a housing or a bezel area) and capable of detecting a user interaction (e.g., proximity, touch, and the like).

Referring to FIG. 8, respective sensors may be disposed in four areas on the upper, lower, left, and right sides of the display. The sensors 852 and 854 may include various types of short-range sensors that detect the proximity or contact of an object, such as near-field communication (NFC), radio frequency identification (RFID), Bluetooth (or Bluetooth low energy), or a touch sensor.

According to an embodiment, the sensors 852 and 854 may be NFC tags, and an external device may include an NFC reader and tag an NFC tag disposed in the electronic device 800. For example, when the external device executes a screen sharing application, an NFC reader may be activated, and the user may make the external device approach an NFC tag corresponding to an area where shared content is to be displayed, thereby performing tagging. The NFC tag may include position information of the display, and for example, if an external device 890 tags an NFC tag 852 on the left side of the main display area, selection information of the left area and identification information of the external device 890 may be transmitted to the electronic device 800 through a wireless connection, and the electronic device 800 may control the expandable display area on the left side to be expanded to display the shared content of the external device 890.

In addition, if the user tags a right NFC tag 854 through another external device 895, the external device 895 may transmit selection information of the right area and identification information to the electronic device 800, and the electronic device 800 may control the expandable display area on the right side to be expanded to display the shared content of the corresponding external device 895.

Accordingly, if the display is entirely expanded, the main content and at least one piece of shared content received from at least one external device may be simultaneously displayed.

According to an embodiment, in the case where the electronic device 800 displays a screen displayed on an external device by mirroring, interaction may occur in different areas through two external devices 890 and 895 so that the screens of two external devices may be mirrored in real time on different areas of the expanded display as described above.

According to an embodiment, the electronic device 800 may receive link information from the external device 890 and obtain shared content from another external device (e.g., an external server) through the link information, and the user may make interaction with multiple areas of the electronic device 800 using a single external device 890 to transmit link information of an image to be transmitted several times.

Figure 9A:
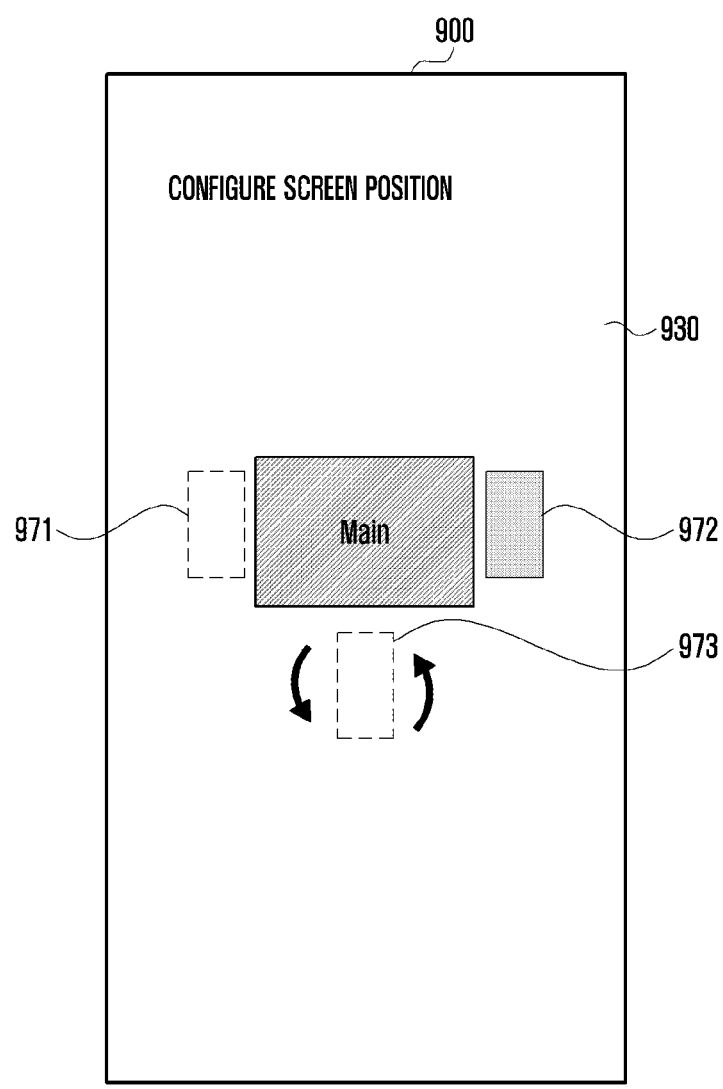
FIGS. 9A and 9B are diagrams illustrating an interface capable of configuring a screen position of an external device according to various embodiments.
Figure 9B:
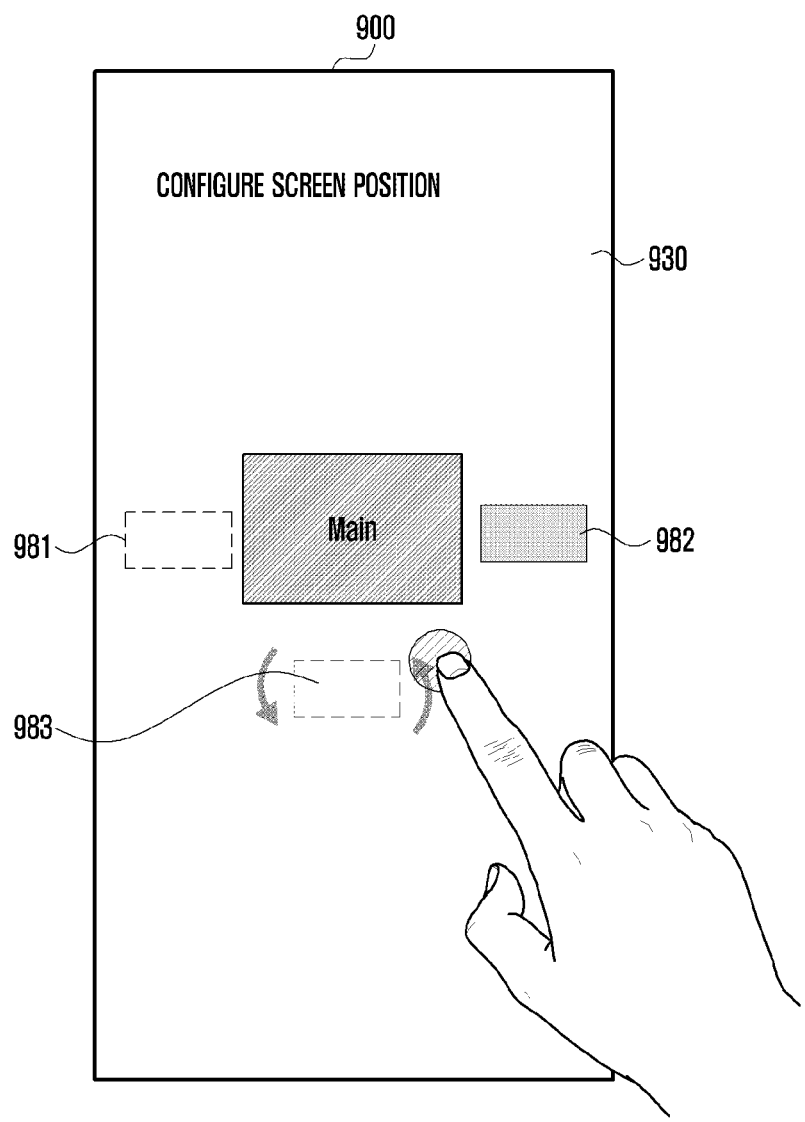

FIGS. 9A and 9B are diagrams illustrating an interface capable of configuring a screen position of an external device according to various embodiments.

According to various embodiments, an external device 900 may execute an application 930 supporting a function of sharing a screen with an electronic device. The application 930 may provide a UI for configuring the position and/or display orientation of the shared content during screen sharing, a UI for configuring the display type of the main content and the shared content, and/or a UI for configuring the size of the content.

Referring to FIG. 9A, a display of the electronic device may include a first expandable display area that is expandable to the left and a second expandable display area that is expandable to the right, and information about the display of the electronic device may be transmitted to the external device 900 through a wired/wireless connection established when the screen sharing function is executed. The external device 900 may display an object 971 indicating the first expandable display area and an object 972 indicating the second expandable display area with reference to display information of the electronic device, and may display an object 973 capable of changing the display orientation (e.g., landscape mode or a portrait mode) of the shared content. For example, if the user selects the object 972 indicating the second expandable display area on the right side from the application 930, corresponding information may be transmitted to the electronic device, and the electronic device may expand the second expandable display area to display the shared content received from the external device 900 at the corresponding position.

According to an embodiment, the external device 900 may include a sensor that detects a tilt of the external device 900 and select an expandable display area to display the shared content according to a tilt direction of the external device 900. For example, if the user tilts the external device 900 to the left, the first expandable display area expandable to the left of the main display area in the electronic device may be determined as an area to display the shared content.

According to an embodiment, the external device 900 may determine an expandable display area to display the shared content, based on a direction of a user gesture (e.g., swipe or flick) on the application 930.

Referring to FIG. 9B, if the user of the external device 900 selects an object 983 capable of changing the display orientation of the shared content, the display orientation of the shared content may be changed from a portrait mode to a landscape mode. In response to the user selection, the object 981 indicating the first expandable display area of the application 930 and the object 982 indicating the second expandable display area of the application 930 may also switch to the landscape mode, and display orientation information may be transmitted to the electronic device. The electronic device may determine the display area of the shared content and/or the extension size of the first expandable display area depending on the received display orientation information.

According to an embodiment, the external device 900 may transmit current orientation information of the external device 900 displaying the shared content, the state of the content, and/or a display orientation mode provided by the content to the external device 900, and the electronic device may determine the display orientation of the shared content, based on the received information.

Figure 10A:
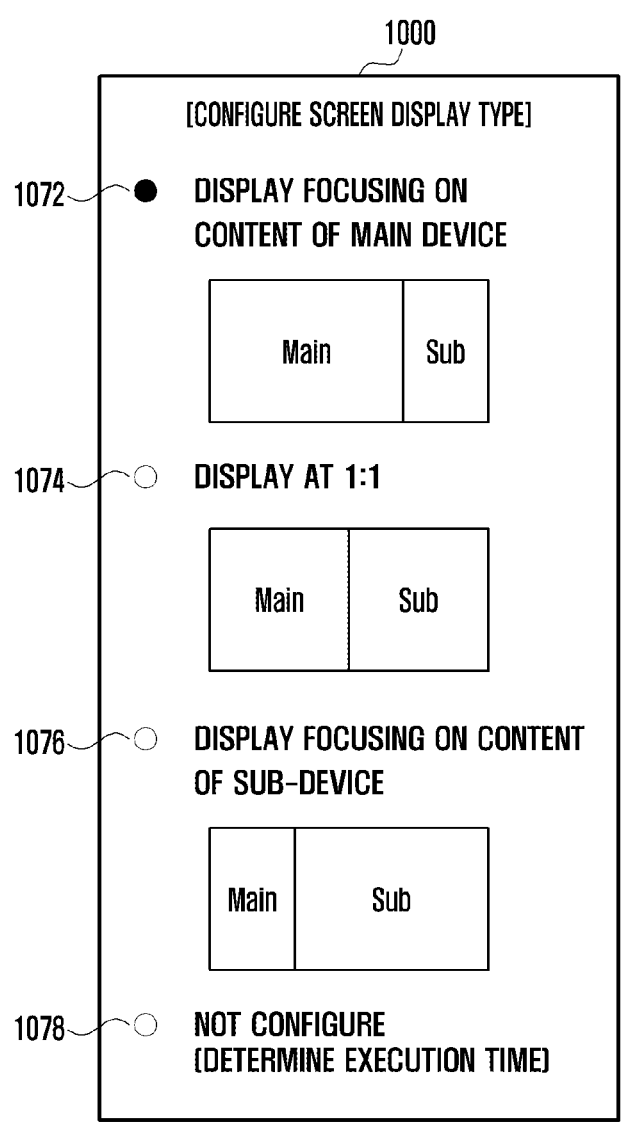
FIGS. 10A, 10B, and 10C are diagrams illustrating interfaces capable of configuring a content representation mode in an external device according to various embodiments.
Figure 10B:
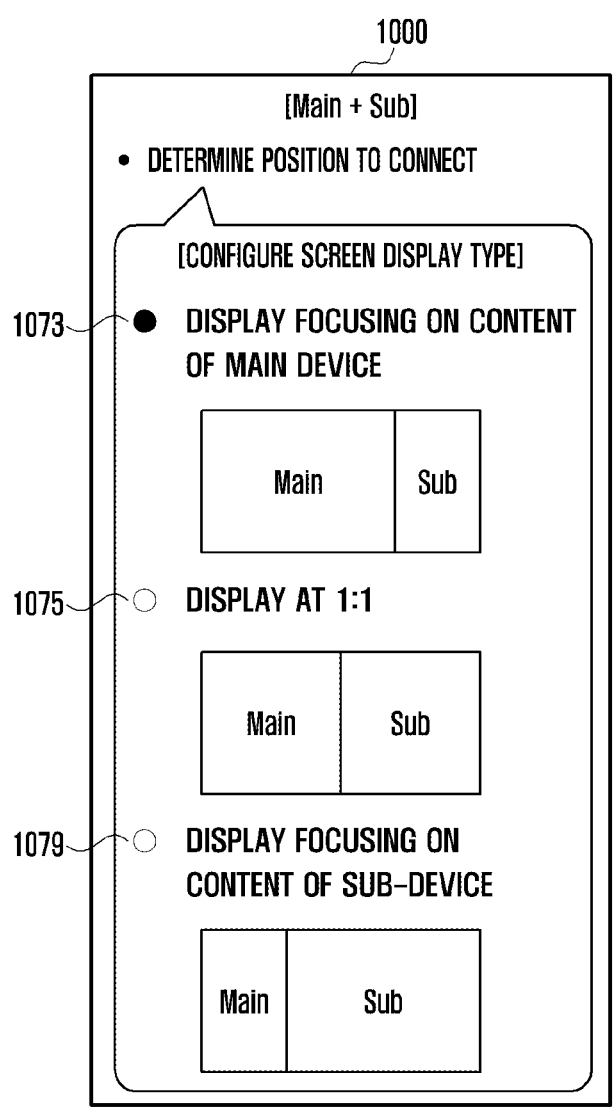
Figure 10C:
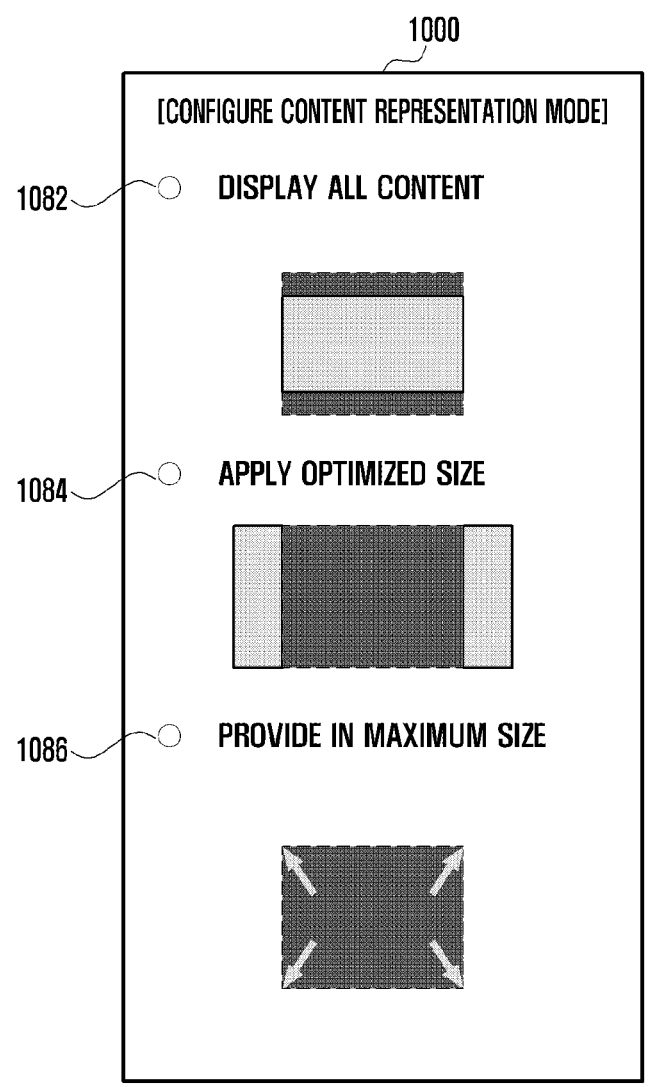

FIGS. 10A, 10B and 10C are diagrams illustrating an interface capable of configuring a content representation mode in an external device according to various embodiments.

According to various embodiments, an external device 1000 may provide a UI for configuring a display type of main content and shared content in an application. Here, the display type may include a mode of displaying content focusing on the main content, a mode of displaying the main content and the shared content at the same ratio, and/or a mode of displaying content focusing on the shared content.

FIG. 10A illustrates an example of a menu capable of specifying a display type of a screen before the external device 1000 executes screen sharing with the electronic device.

Referring to FIG. 10A, the external device 1000 may provide a description of each mode in an application and graphic information 1072, 1074, and 1076 thereof, and if one mode is selected according to a user input (1072), information on the selected mode may be transmitted to the electronic device. For example, the external device 1000 may provide a menu for selecting a first mode 1072 in which content is displayed focusing on the main content of the electronic device, a second mode 1074 in which the main content of the electronic device and the shared content of the external device are displayed in substantially the same size, and a third mode 1076 in which content is displayed focusing on the shared content of the external device. If the user selects not-configure 1078 from the menu in FIG. 10A, the external device 1000 may provide a UI for selecting a mode when the content is actually shared with the electronic device.

FIG. 10B illustrates a UI for selecting a mode when content is shared with the electronic device. The external device 1000 may provide menu for selecting a first mode 1073 in which content is displayed focusing on the main content of the electronic device, a second mode 1075 in which the main content of the electronic device and the shared content of the external device are displayed in substantially the same size, and a third mode 1079 in which content is displayed focusing on the shared content of the external device.

An example in which the electronic device displays the shared content and the main content on the expanded display according to the mode selected through the UI in FIG. 10A or 10B will be described in more detail with reference to FIG. 13.

According to various embodiments, the external device 1000 may provide a UI for configuring the size (or ratio) of content in an application. The electronic device may expand the display to display the shared content, but the size or aspect ratio of the expandable display area may be different from that of the shared content.

Referring to FIG. 10C, examples of a representation mode of content may include a mode of displaying all content, a mode of displaying content in an optimal size, and a mode of displaying content in a maximum size. For example, the mode of displaying all content 1082 may be a mode in which all of the shared content is displayed on the display area (or second area) of the shared content while maintaining the aspect ratio of the shared content and in which the area where the shared content is not displayed due to a difference of the aspect ratio is processed to be black. The mode of displaying content in the optimal size 1084 may be a mode in which a portion of one side of the shared content in the horizontal or vertical direction, which is greater than the display area, is cut out and the remaining portions are displayed. The mode of displaying content in the maximum size 1086 may be a mode of displaying the shared content by changing the resolution thereof to the maximum size according to the display area of the shared content without maintaining the aspect ratio of the shared content. The external device 1000 may provide information on a mode selected by the user in an application to the electronic device, and the electronic device may determine a representation mode of the shared content according to the mode information.

Figure 11A:
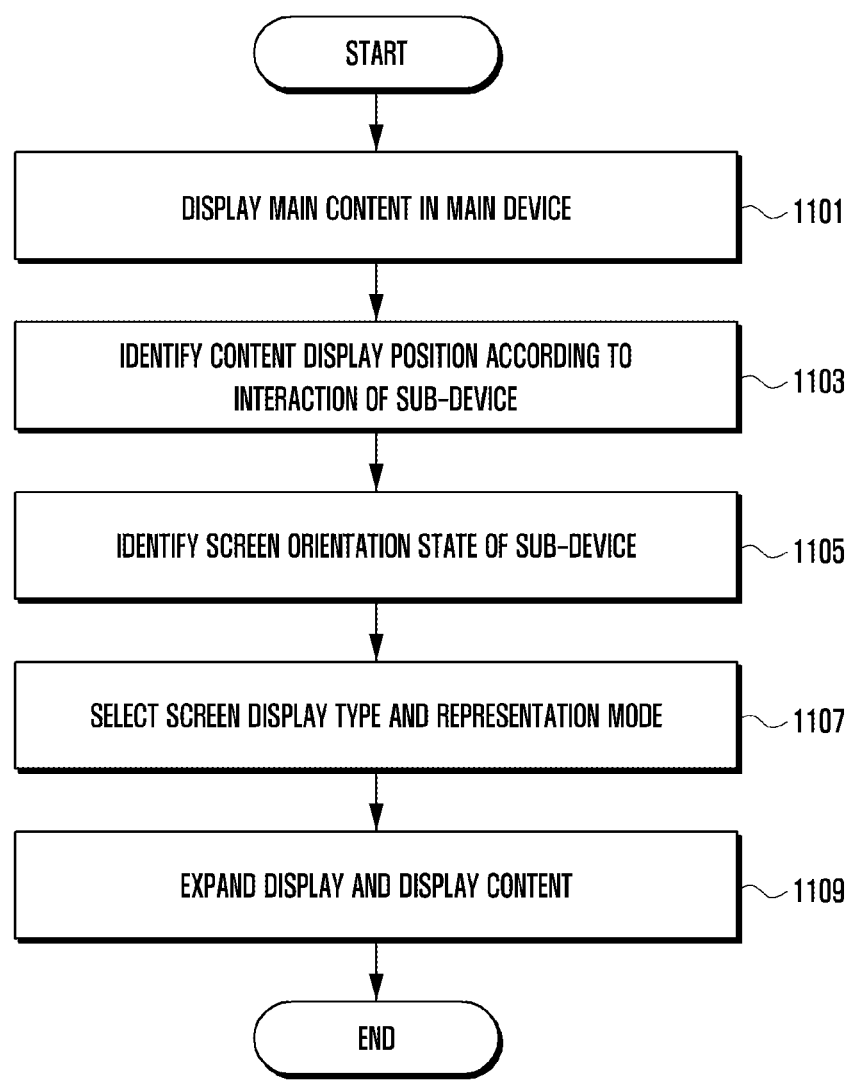
FIGS. 11A and 11B are flowcharts illustrating example methods of providing content by an electronic device according to various embodiments.

FIG. 11A is a flowchart illustrating an example method of providing content in an electronic device according to various embodiments.

The illustrated method may be performed by an electronic device (e.g., the electronic device 500 in FIG. 5) including the above-described expandable display (e.g., the display 400 in FIGS. 4A to 4E), and descriptions of technical features made above may not be repeated here.

According to various embodiments, an electronic device (or a main device) may display main content (or first content) on a main display area of a display in the state in which the display is not expanded. (1101)

According to various embodiments, the electronic device may detect a user interaction using an external device and identify a display position of shared content on an expanded display according to the user interaction. For example, the electronic device may determine one of a left area, an upper area, a center area, a lower area, and a right area as the display position of the shared content. (1103)

According to various embodiments, the electronic device may identify a screen orientation state of the external device. For example, the screen orientation state may be any one of a vertical screen orientation state (or a portrait mode) and a horizontal screen orientation state (or a landscape mode). (1105)

Although FIG. 11A illustrates that operation 1105 is performed after operation 1103, the display is not limited thereto, and operation 1103 may be performed after operation 1105 or, at least in part, simultaneously therewith.

According to various embodiments, the electronic device may select a screen display type and a representation mode. (1107) For example, the user may select a screen display type and a representation mode through the user interface shown in FIGS. 9A, 9B, 10A, 10B, and 10C using the external device, and the external device may transmit the selected information to the electronic device.

If the display area, display orientation, and/or display type of the main content and shared content are determined, the electronic device may determine the extension length of the expandable display area and expand the display, thereby displaying the main content and shared content. (1109)

Figure 11B:
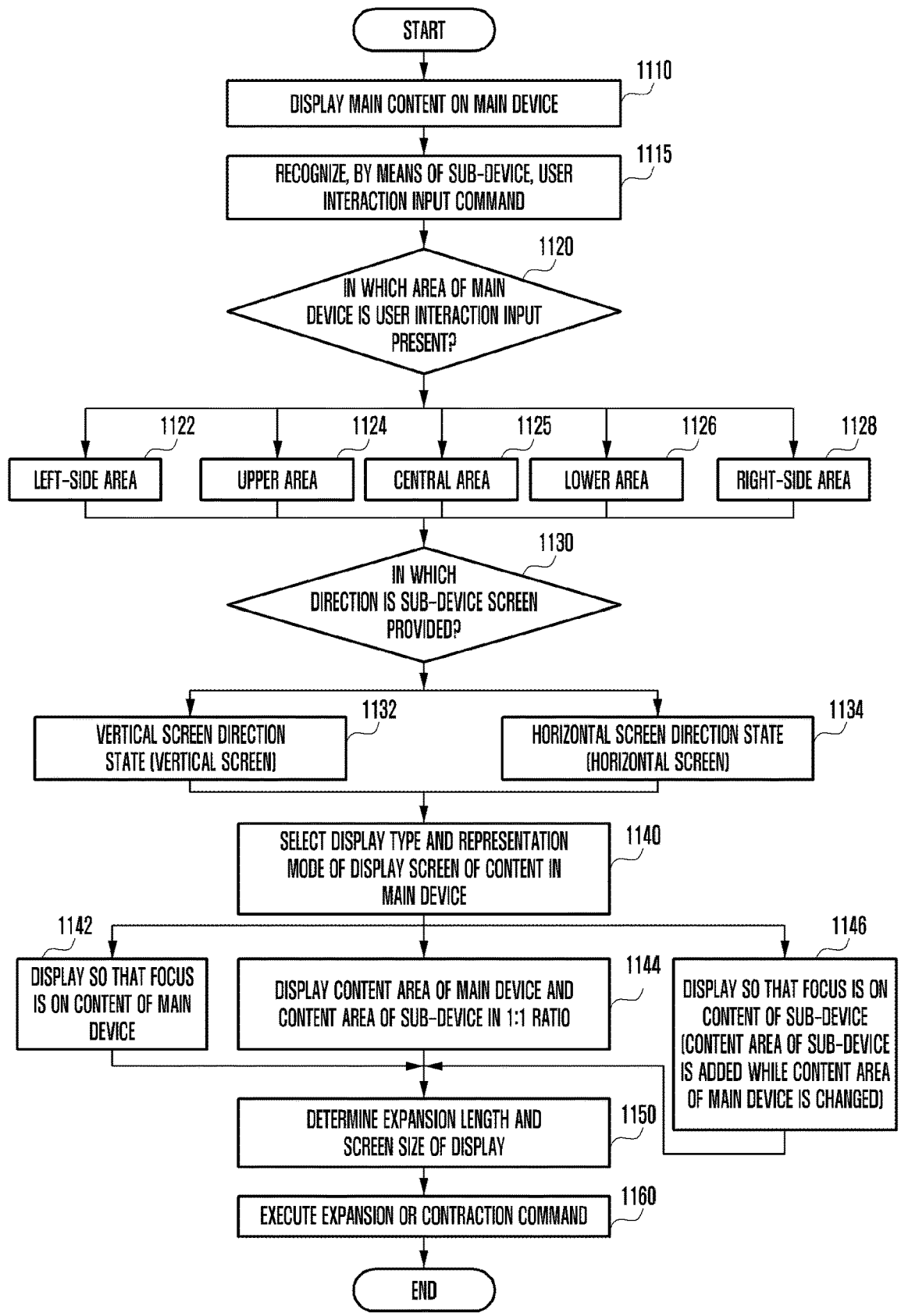

FIG. 11B is a flowchart illustrating an example method of providing content in an electronic device according to various embodiments.

The illustrated method may be performed by an electronic device (e.g., the electronic device 500 in FIG. 5) including the above-described expandable display (e.g., the display 400 in FIGS. 4A to 4E), and descriptions of technical features made above may not be repeated here.

According to various embodiments, an electronic device (or a main device) may display main content (or first content) on the main display area of a display in the state in which the display is not expanded (1110). For example, the main content may include content produced by an application and broadcast content.

According to various embodiments, an external device (or a sub-device) may be connected to the electronic device through a wired or wireless interface and may execute a screen sharing function according to user interaction (1115).

According to various embodiments, the electronic device may determine an area to display shared content according to the user interaction. The electronic device may identify the area of the display of the electronic device where the user interaction occurred (1120). For example, the display may be divided into four areas on the left, right, upper, and lower sides in an unexpanded state, and the electronic device may determine one of a left area 1122, an upper area 1124, a central area 1125, a lower area 1126, and a right area 1128 to be the position thereof depending on the user interaction.

According to various embodiments, in the state in which a screen sharing function is executed, the electronic device may determine an area to display shared content, based on an interaction on a sensor (e.g., a touch sensor, NFC, Bluetooth, or a camera) disposed in the electronic device, a touch input onto the main display area, and/or an external device.

According to various embodiments, the electronic device may determine display orientation of the shared content (1130). The electronic device may determine the display orientation of the shared content as a vertical screen orientation state (or a portrait mode) 1132 or a horizontal screen orientation state (or a landscape mode) 1134. For example, the external device may transmit orientation information obtained through an inertial sensor (e.g., an acceleration sensor or a gyro sensor) to the electronic device, and the electronic device may determine whether to display the shared content in a landscape mode or a portrait mode, based on the received orientation information. Alternatively, the electronic device may obtain the state of a screen and content input in the application of the external device and/or a display orientation mode provided by the content and determine the display orientation of the shared content.

According to an embodiment, the electronic device may select a display position of the shared content according to user interaction after determining the screen providing orientation of the external device (1120, 1122, 1124, 1125, 1126, and 1128). (1130, 1132, and 1134)

According to various embodiments, the electronic device may select a display type and a representation mode of content (1140). The external device may provide a UI for configuring a display type of main content and shared content in an application and determine a display type of content according to a user input. Here, the display type may include a mode 1142 of displaying content focusing on the main content, a mode 1144 of displaying the main content and the shared content at the same ratio, and/or a mode 1146 of displaying content focusing on the shared content. If the mode 1146 of displaying content focusing on the shared content is selected, the electronic device may determine a display area in a manner of adding the area of the shared content of the external device while changing (or reducing) the main content area of the electronic device as the size of the shared content is increased.

According to various embodiments, if the display area, display orientation, and/or display type of the main content and the shared content are determined, the electronic device may determine an extension length of the expandable display area (1150).

According to various embodiments, the electronic device may execute a command to expand or reduce the display (1160). For example, in the case where the expandable display area is configured to be automatically expanded by motor control, or if the display is configured to be manually expanded by user force, the electronic device may provide the main display area with information for guiding the user to expand the expandable display area.

Figure 12:
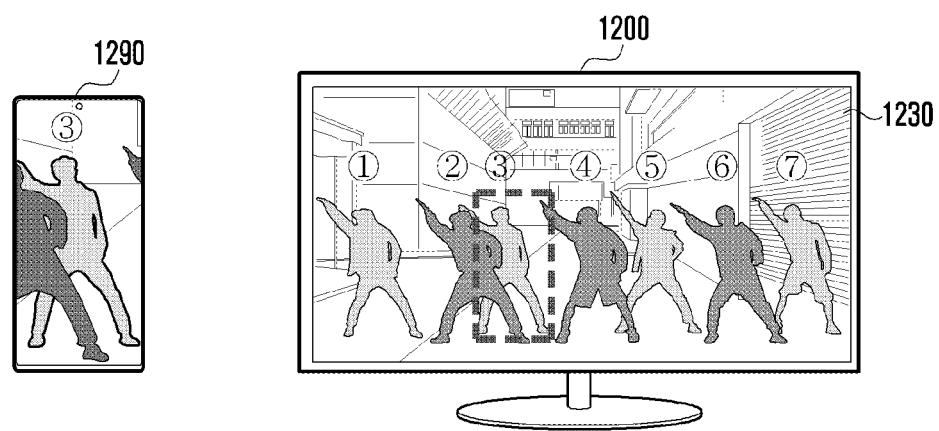
FIG. 12 is a diagram illustrating an example of providing content of an electronic device and content of an external device on a display of the electronic device according to various embodiments.
Figure 12:
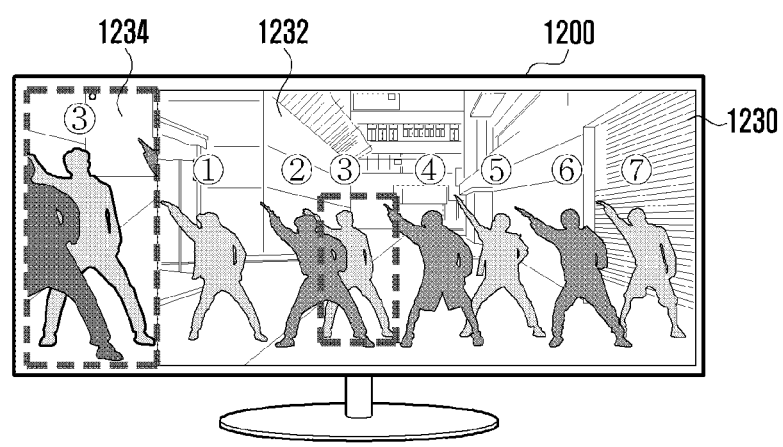

FIG. 12 is a diagram illustrating an example of providing content of an electronic device and content of an external device on a display of the electronic device according to various embodiments.

Referring to FIG. 12, the user may watch a broadcasting screen through an electronic device 1200 (e.g., a monitor, TV, or a tablet PC) and, at the same time, display an enlarged (close-up) screen in which only a portion of the broadcasting screen is enlarged through an external device 1290 (e.g., a smartphone). According to an embodiment, the electronic device 1200 may receive and display a broadcast in real time through a terrestrial network, a cable network, or the Internet, and the external device 1290 may stream an enlarged screen in real time through an Internet browser or a media application.

According to various embodiments, the user may establish a wireless connection (e.g., Wi-Fi direct, Wi-Fi aware, or Bluetooth) for screen sharing with the external device 1290 and input a user interaction for determining a display area of shared content. For example, if the user tags the external device 1290 onto an NFC tag provided on the right side of a display 1230 of the electronic device 1200, the external device 1290 may transmit information of the recognized NFC tag to the electronic device 1200, and the electronic device 1200 may determine to display the shared content by expanding the right expandable display area.

According to various embodiments, if the display area of the shared content is determined, the external device 1290 may transmit link information of the shared content (e.g., an enlarged screen) to the electronic device 1200, and the electronic device 1200 may access the corresponding link through an Internet browser or a media application to stream the enlarged screen in real time. The electronic device 1200 may expand the expandable display area and display an enlarged screen 1234 streamed in real time together with a broadcast screen 1232.

Figure 13:
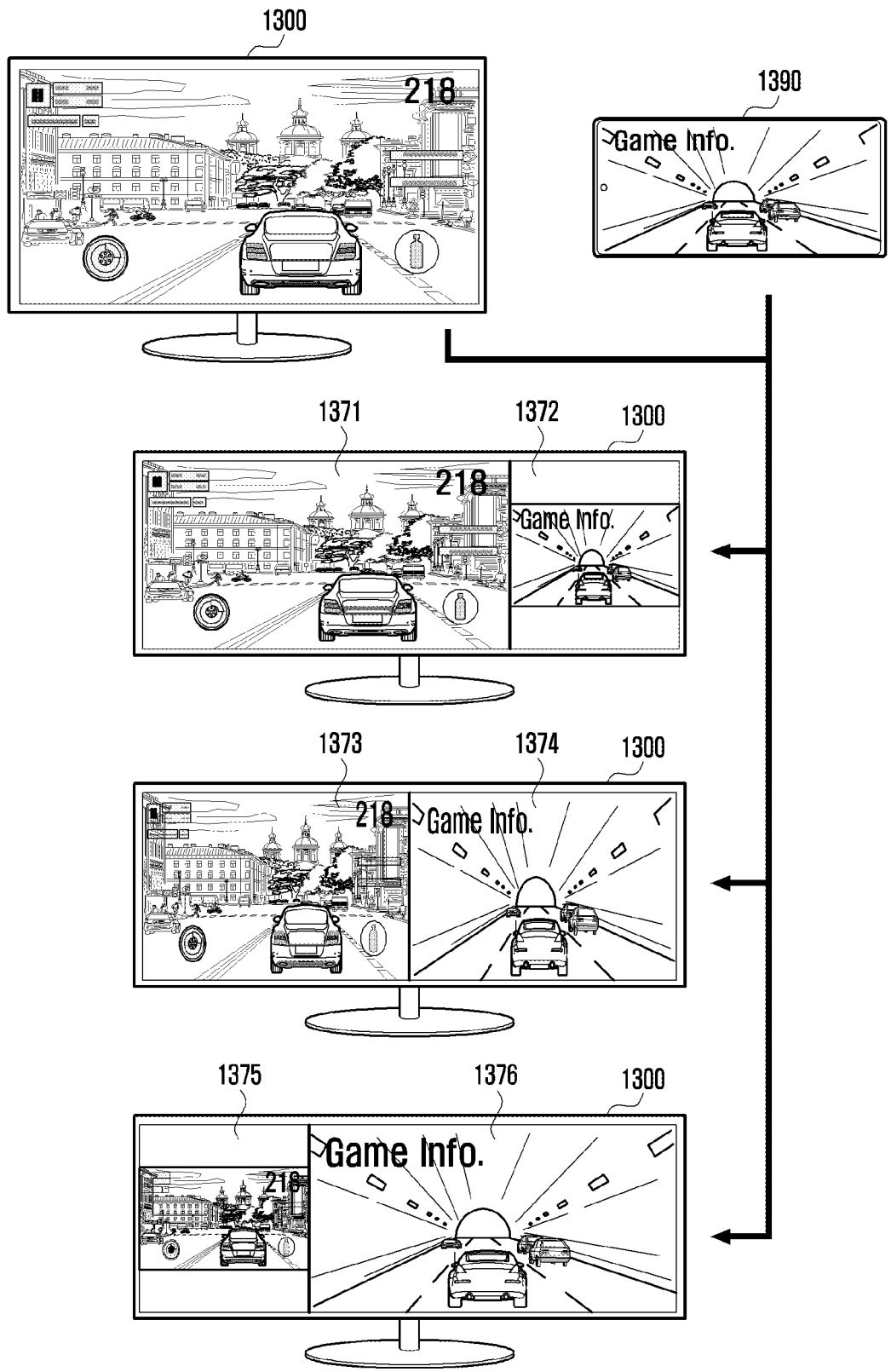
FIG. 13 is a diagram illustrating an example of providing content of an electronic device and content of an external device on a display of the electronic device according to various embodiments.

FIG. 13 is a diagram illustrating an example of providing content of an electronic device and content of an external device on a display of the electronic device according to various embodiments.

According to various embodiments, the electronic device 1300 may configure the display type of each piece of content when displaying the main content and the shared content in the state in which a display is expanded. Here, the display type may include a mode of displaying content focusing on the main content, a mode of displaying the main content and the shared content at the same ratio, and/or a mode of displaying content focusing on the shared content, and the display mode may be determined through a UI (e.g., FIG. 10A) provided from an application of the external device 1390.

Referring to FIG. 13, if a mode of displaying content focusing on the main content is selected, the electronic device 1300 may display main content 1371 on the entire main display area and display shared content 1372 on the expandable display area in the expanded display. In this case, if the aspect ratio of the shared content 1372 is different from that of the expandable display area in the horizontal direction, the shared content 1372 may be reduced and displayed, and the remaining area may be processed to be black. Alternatively, the electronic device 1300 may cut out a portion of the shared content 1372 and display the same in an optimal size, or may enlarge and display the shared content 1372 without maintaining the aspect ratio thereof to match the display area.

According to an embodiment, in the case of a mode of displaying the main content and the shared content at the same ratio, the electronic device 1300 may display the main content 1373 and the shared content 1374 in substantially the same size on the expanded display. In this case, if the entire area of the display is unable to accommodate the main content 1373 and the shared content 1374, both the main content 1373 and/or the shared content 1374 may be displayed, may be displayed in an optimized size, or may be displayed in a maximum size.

According to an embodiment, if a mode of displaying content focusing on the shared content 1376 is selected, the electronic device 1300 may reduce main content 1375 and display the same on a portion of the main display area, and may display the shared content 1376 on the remaining portions of the main display area and the expandable display area.

Figure 14:
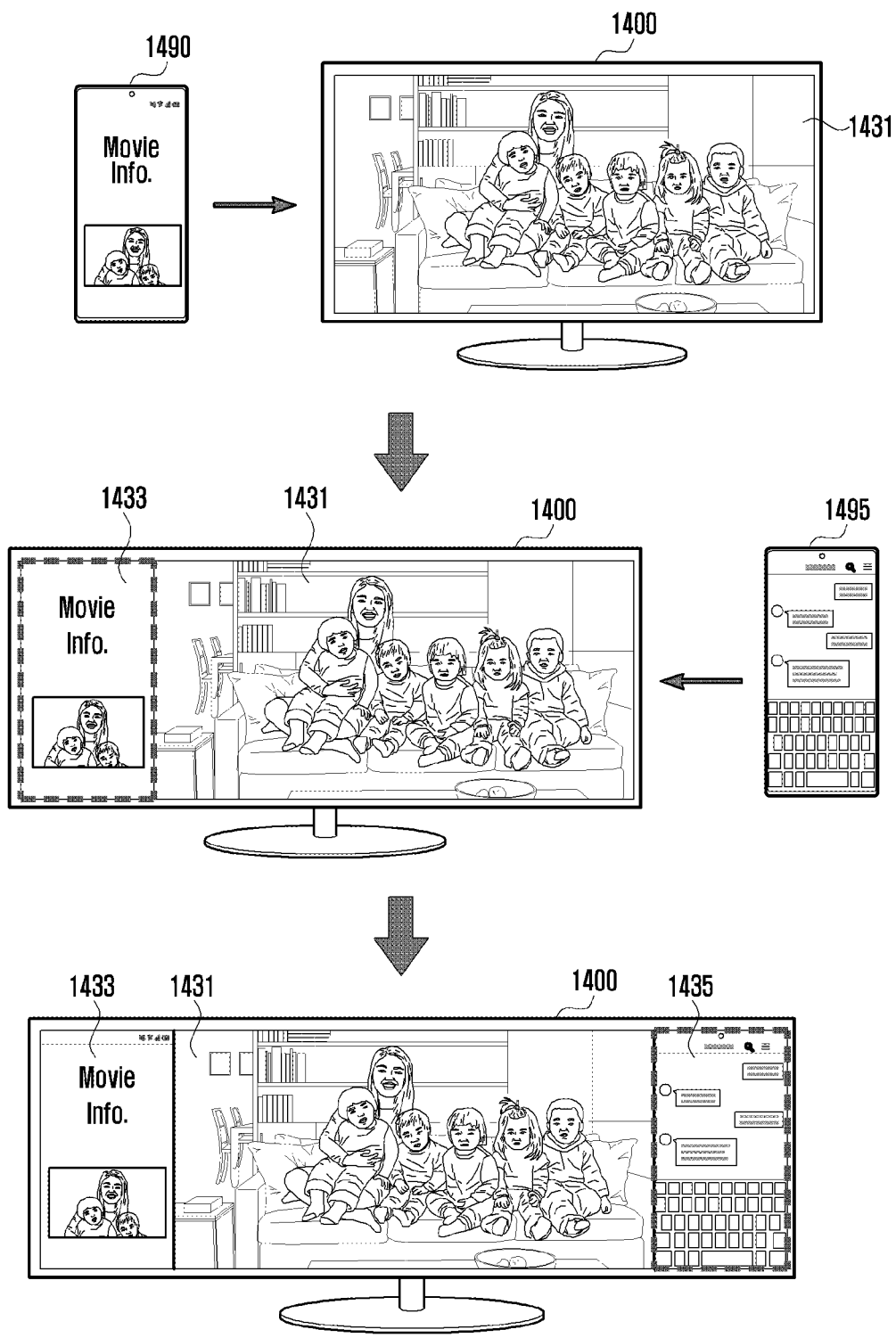
FIG. 14 is a diagram illustrating an example of providing content of an electronic device and content of an external device on a display of the electronic device according to various embodiments.

FIG. 14 is a diagram illustrating an example of providing content of an electronic device and content of an external device on a display of the electronic device according to various embodiments.

According to various embodiments, a display of an electronic device 1400 may include a first expandable display area that is expandable from the main display area in a first direction and a second expandable display area that is expandable from the main display area in a second direction. Referring to FIG. 14, the display may include a first expandable display area and a second expandable display area that are expandable to the right and left, respectively.

According to various embodiments, the electronic device 1400 may display content received from a first external device 1490 on the first expandable display area and display content received from a second external device 1495 on the second expandable display area.

Referring to FIG. 14, while the main content 1431 is being displayed in an electronic device 1400 (e.g., a monitor, TV, or a tablet PC), a first external device 1490 (e.g., a smartphone) may display first shared content 1433 (e.g., an Internet browser), and a second external device 1495 may display second shared content 1435 (e.g., a messenger). If a screen sharing function is initiated and if the user makes an interaction (e.g., a touch onto the display, NFC tagging, or selection on an application UI) for selecting the right side of the electronic device 1400 using the first external device 1490, the electronic device 1400 may determine the first expandable display area on the right side to be an area to display the first shared content 1433. If the first expandable display area is expanded, the electronic device 1400 may continue to display the main content 1431 on the main display area and display the first shared content 1433 received from the first external device 1490 on the first expandable display area.

In the state where the main content 1431 and the first shared content 1433 are displayed, the user may input an interaction for selecting the left side of the electronic device 1400 using the second external device 1495. In this case, the electronic device 1400 may determine the second expandable display area on the left side to be an area to display the second shared content 1435 and, if the second expandable display area is expanded, display the main content 1431, the first shared content 1433, and the second shared content 1435 on the main display area, the first expandable display area, and the second expandable display area, respectively.

Figure 15:
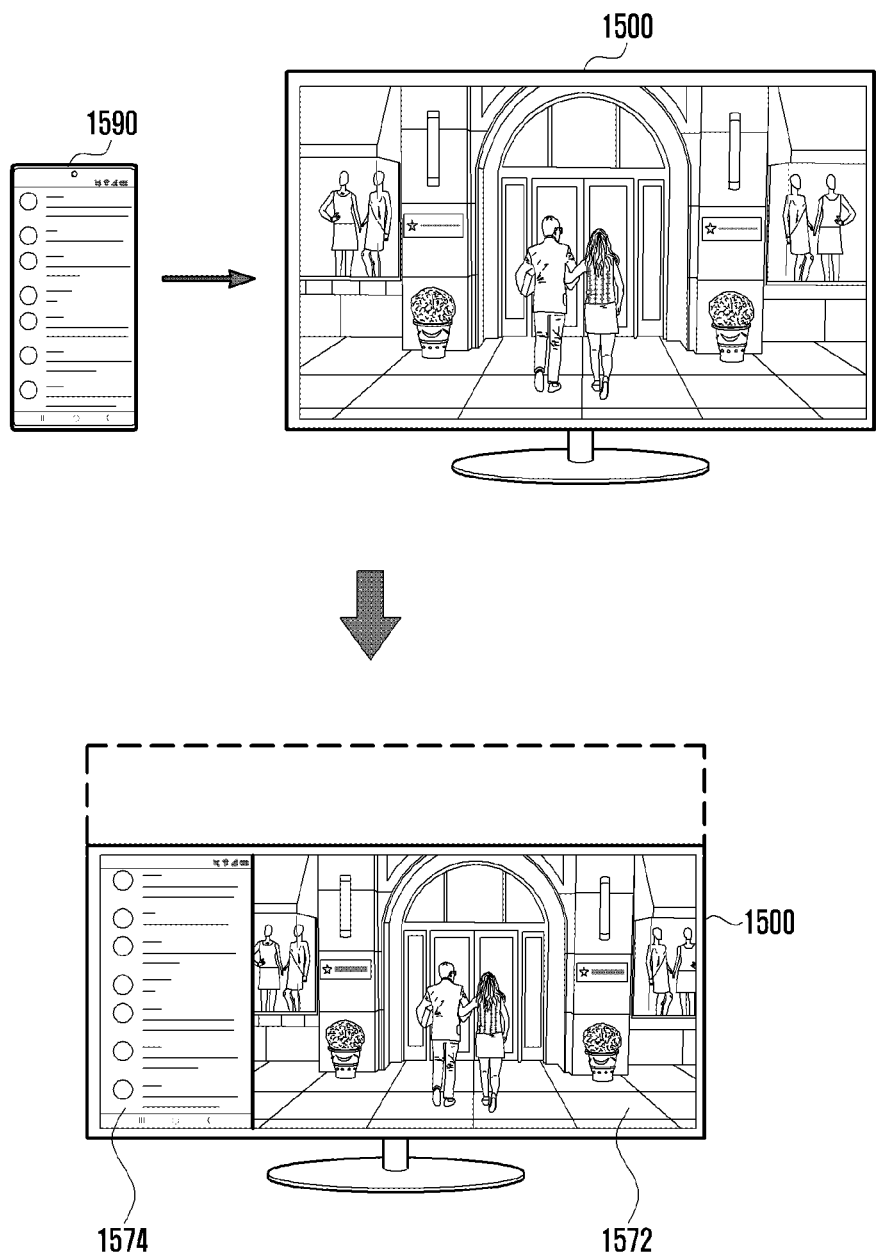
FIG. 15 is a diagram illustrating an example of providing content of an electronic device and content of an external device on a display of the electronic device according to various embodiments.

FIG. 15 is a diagram illustrating an example of providing content of an electronic device and content of an external device on a display of the electronic device according to various embodiments.

According to various embodiments, an electronic device 1500 may display main content 1572 in the state in which a display is expanded and, if a screen sharing function is executed, reduce the display, based on user selection, to display the main content 1572 and shared content 1574.

Referring to FIG. 15, the electronic device 1500 may display the main content 1572 in a main display area and an expandable display area in the state in which the display is expanded. At the same time, the user may watch shared content 1574 through an external device 1590.

If a screen sharing function is executed and if the content representation mode is selected as a mode of displaying both the main content 1572 and the shared content 1574, the electronic device 1500 may identify a screen size for displaying both the main content 1572 and the shared content 1574, based on the sizes and aspect ratios of the main content 1572 and the shared content 1574. For example, although the aspect ratio is 16:9 in the state in which the display is expanded, the aspect ratio required to further display the shared content 1574 on the right side of the main content 1572 may be 21:9. In this case, in order to adjust the aspect ratio to 21:9, the electronic device 1500 may control a portion of the expandable display area to slide in such that the aspect ratio becomes 21:9.

Figure 16:
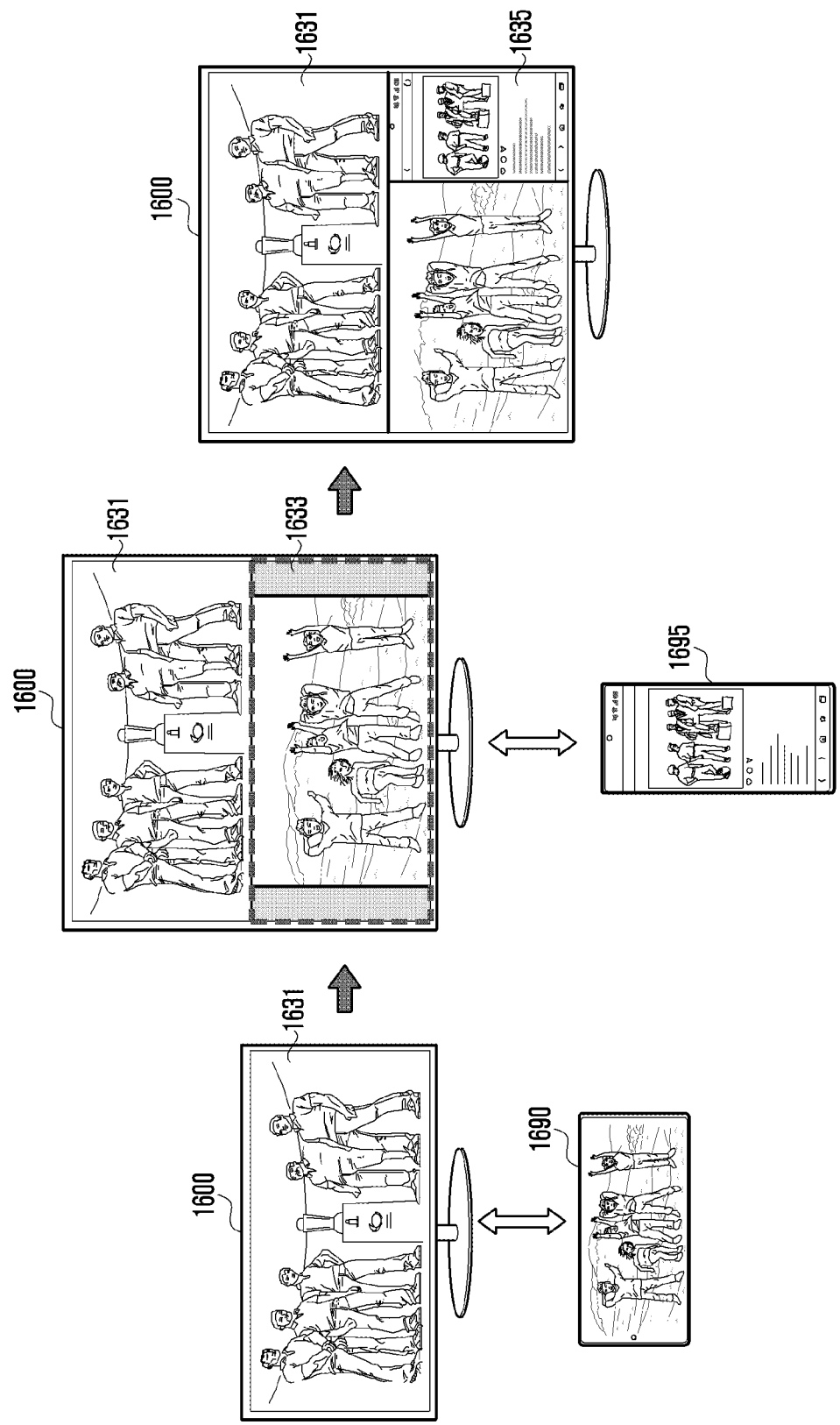
FIG. 16 is a diagram illustrating an example of providing content of an electronic device and content of an external device on a display of the electronic device according to various embodiments.

FIG. 16 is a diagram illustrating an example of providing content of an electronic device and content of an external device on a display of the electronic device according to various embodiments.

Referring to FIG. 16, a display of an electronic device 1600 may include an expandable display area that is expanded in the upward direction, and the electronic device 1600 may display main content 1631 in the main display area in the state in which the display is not expanded, and the external device 1690 may display first shared content 1633 in a landscape mode.

The user may execute a function of sharing a screen between the external device 1690 and the electronic device 1600, and determine transmission of link information as a method of transmitting the first shared content 1633 in the external device 1690. If the user inputs an interaction for selecting the lower direction of the display of the electronic device 1600 through the first external device 1690, the electronic device 1600 may determine the display position of the first shared content 1633 to be the lower side (e.g., a lower portion of the main display area) and determine the display position of the main content 1631 to be the upper side (e.g., the remaining portion of the main display area and the expandable display area). The electronic device 1600 may execute an application according to link information received from the external device 1690 to receive the first shared content 1633 and display the first shared content 1633 on the determined area.

Thereafter, the user may select transmission of the second shared content 1635 in a mirroring manner through the external device 1695 and input an interaction for selecting a lower direction of the display. The electronic device 1600 may receive the second shared content 1635 from the external device 1690 and display the first shared content 1633 and the second shared content 1635 on an area below the main content 1631 so as to be separate.

Although an example of further displaying the first shared content 1633 and the second shared content 1635 has been described in the embodiment in FIG. 16, the electronic device 1600 may receive more shared content from one or more external devices and display the same, and the display position of each piece of shared content may be determined depending on the position of user interaction.

Figure 17:
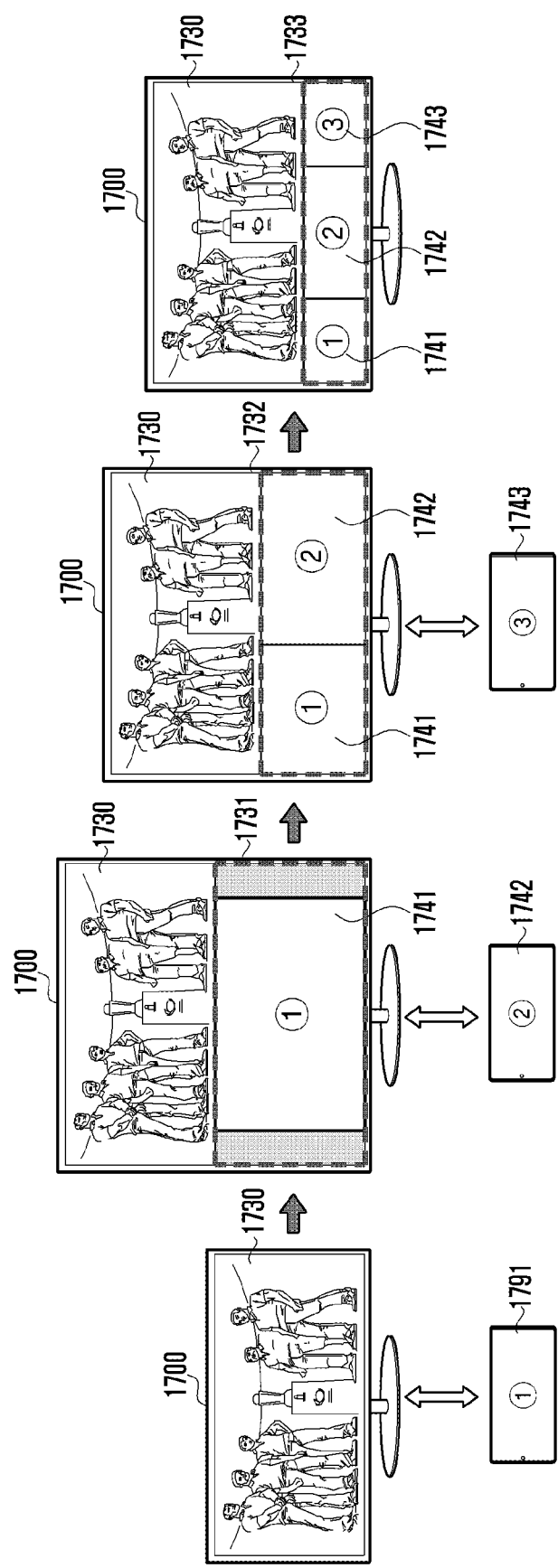
FIG. 17 is a diagram illustrating an example of providing content of an electronic device and content of an external device on a display of the electronic device according to various embodiments.

FIG. 17 is a diagram illustrating an example of providing content of an electronic device and content of an external device on a display of the electronic device according to various embodiments.

FIG. 17 relates to an example in which a plurality of interactions is sequentially made on an area of a display 1730 of an electronic device 1700 using an external device to provide a plurality of pieces of link information to the electronic device 1700.

Referring to FIG. 17, the electronic device 1700 may detect a first interaction (e.g., NFC tagging) of an external device in a downward direction of the display 1730 in the state in which the display 1730 is not expanded. At this time, the external device may receive first content 1791 from an external server through the link information and display the same, and the external device may transmit link information of the first content 1791 to the electronic device 1700 according to the first interaction with the electronic device 1700.

According to various embodiments, the electronic device 1700 may expand the display 1730 in response to the first interaction of the external device and determine an area to display the shared content of the external device to be the downward direction of the expanded display 1730. The electronic device 1700 may display the main content and the first content 1741 obtained through the link information on the expanded display 1731. At this time, the electronic device 1700 may expand the display 1730 to the maximum size, display the first content 1741 on the area of the expanded display 1731 according to a predetermined aspect ratio (e.g., 16:9), and process the remaining areas to a black screen. According to an embodiment, the electronic device 1700 may determine the size to which the display 1730 is expanded according to the aspect ratio of the first content 1741.

According to various embodiments, the electronic device 1700 may detect a second interaction of the external device in the downward direction of the display 1730 in the state in which the main content and the first content 1741 are displayed. At this time, the external device may be in the state of displaying second content 1742 received from an external server, and the external device may transmit link information of the second content 1742 to the electronic device 1700 according to the second interaction with the electronic device 1700.

According to various embodiments, the electronic device 1700 may obtain the second content 1742 from the external server in real time using the link information and display the main content, the first content 1741, and the second content 1742 on the expanded display 1730. At this time, the electronic device 1700 may further expand or reduce the area of the expanded display 1732 in consideration of the screen ratios of the first content 1741 and the second content 1742.

According to various embodiments, the electronic device 1700 may detect a third interaction of the external device in the downward direction of the display 1730 while displaying the main content, the first content 1741, and third content 1743. At this time, the external device may be in the state of displaying the third content 1743 received from an external server, and the external device may transmit link information of the third content 1743 to the electronic device 1700 according to the third interaction with the electronic device 1700.

According to various embodiments, the electronic device 1700 may obtain the third content 1743 from the external server in real time using the link information and display the main content, the first content 1741, the second content 1742, and the third content 1743 on the expanded display 1730. At this time, the electronic device 1700 may further expand or reduce the area of the expanded display 1733 in consideration of the aspect ratios of the first content 1741, the second content 1742, and the third content 1743.

According to various embodiments, the electronic device 1700 may change the display position of content according to a user interaction or a user input to the external device in the state in which the main content and at least one piece of shared content (e.g., the first content 1741, the second content 1742, or the third content 1743) are displayed. For example, if the user selects the first content 1741, the first content 1741 may be displayed in a large size on the display area of the main content, and the main content may be displayed in a small size on the display area of the first content 1741 or the display thereof may be stopped.

Figure 18:
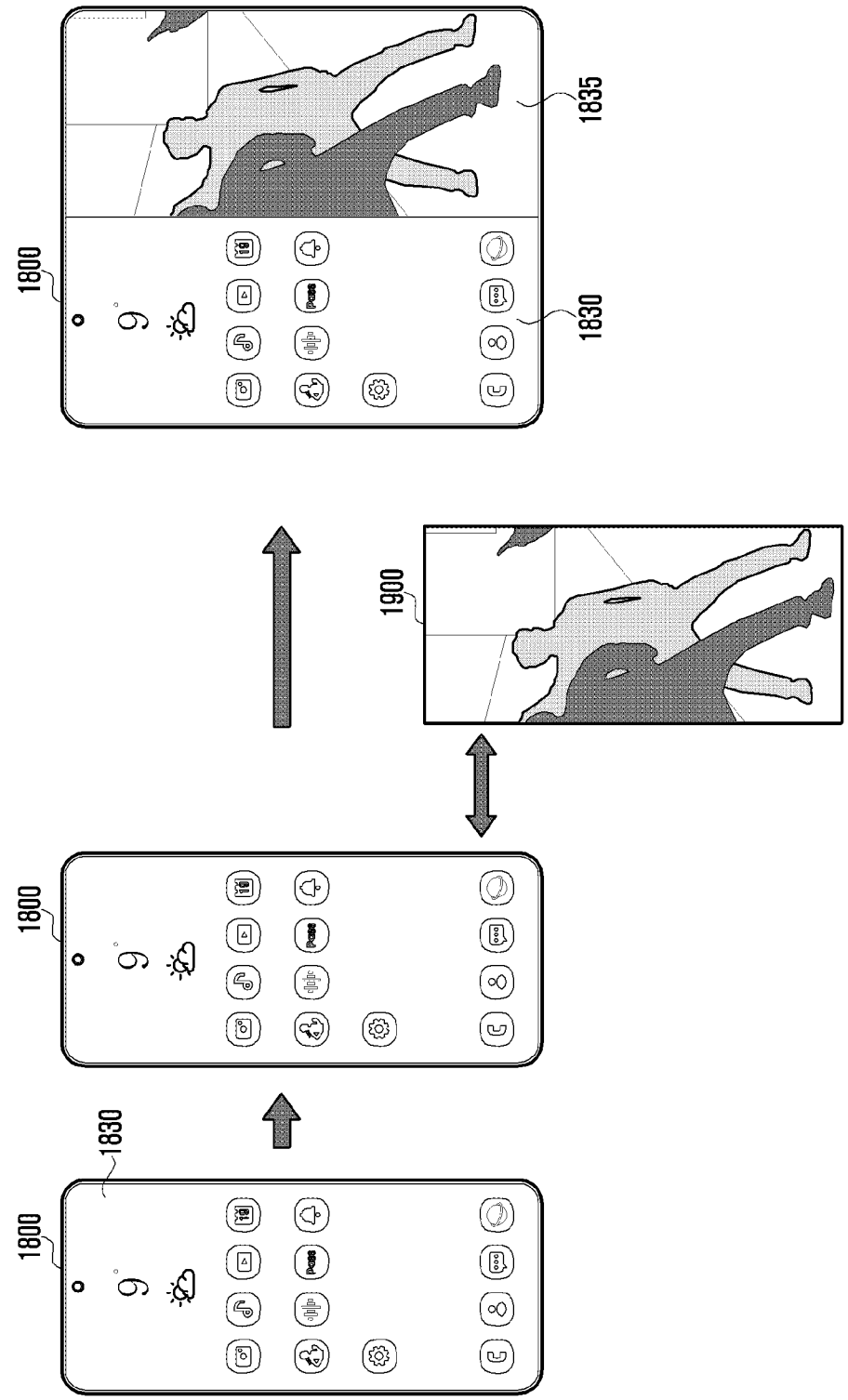
FIG. 18 is a diagram illustrating an example of providing content of an electronic device and content of an external device on a display of the electronic device according to various embodiments.

FIG. 18 is a diagram illustrating an example of providing content of an electronic device and content of an external device on a display of the electronic device according to various embodiments.

FIG. 18 illustrates an embodiment in which an electronic device 1800 is implemented as a smartphone having an expandable display 1830.

Referring to FIG. 18, the electronic device 1800 may display main content (e.g., a home screen) of the electronic device 1800 in the state where a display 1830 is not expanded. Thereafter, if an interaction with another electronic device 1800 (e.g., NFC tagging or a touch input onto a touch screen) occurs, the display 1830 may be expanded, and the main content of the electronic device 1800 and shared content received from an external device 1900 may be displayed on a main display area and an expandable display area 1835 of the expanded display 1830, respectively.

An electronic device according to various example embodiments may include: a display including a main display area and at least one expandable display area, the at least one expandable display area is hidden in the housing in a slide-in state and exposed to outside in a slide-out state and the main display area is exposed to outside in the slide-in state and the slide-out state, a communication module including communication circuitry, and a processor operatively connected to the display and the communication module, wherein the processor is configured to: control the display to display first content on the main display area in the slide-in state in which the at least one expandable display area is hidden in the housing, establish a connection with an external device through the communication module, determine a first area to display the first content and a second area to display second content based on information received from the external device through the communication module in the slide-out state in which the at least one expandable display area is exposed to outside, and control the display to display the first content on the determined first area and display the second content on the determined second area based on the at least one expandable display area being exposed to outside.

According to various example embodiments, the display may include the at least one expandable display area expandable from the main display area in at least one of upward, downward, left, and right directions.

According to various example embodiments, the processor may be configured to: control the display to be expanded based on the first area and the second area being determined.

According to various example embodiments, the processor may be configured to: control the display to display guide information for guiding expansion of the at least one expandable display area on the main display area based on the first area and the second area being determined.

According to various example embodiments, the processor may be configured to: determine the main display area as a first area to display the first content and determine the expandable display area as a second area to display the second content in the state in which the display is expanded.

According to various example embodiments, the processor may be configured to determine the second area to display the second content based on a touch input received on the display.

According to various example embodiments, the electronic device may further include at least one sensor disposed on at least one side of the display, and the processor may be configured to determine the second area to display the second content based on a detection result of the sensor.

According to various example embodiments, the processor may be configured to determine the second area to display the second content based on information received from the external device.

According to various example embodiments, the processor may be configured to: determine a display orientation of the second content to be any one of a landscape mode or a portrait mode; and determine the second area based on the determined display orientation of the second content.

According to various example embodiments, the processor may be configured to determine the display orientation of the second content based on orientation information of the external device received from the external device through the communication module.

According to various example embodiments, the processor may be configured to determine a size of the first area based on the determined display orientation of the second content.

According to various example embodiments, the processor may be configured to change the aspect ratio of at least one piece of the first content and the second content according to the determined first and second areas or determine the first area and the second area based on aspect ratios of the first content and the second content.

According to various example embodiments, the display may include: a first expandable display area expandable in a first direction from the main display area and a second expandable display area expandable in a second direction from the main display area, and the processor may be configured to control the display to display content received from a first external device in the first expandable display area and display content received from a second external device in the second expandable display area.

According to various example embodiments, the information received from the external device may include at least one piece of the second content or link information for obtaining the second content.

According to various example embodiments, a method for providing content in an electronic device that includes a display including a main display area and at least one expandable display area, wherein the at least one expandable display area is hidden in a housing of the electronic device in a slide-in state and exposed to outside in a slide-out state and the main display area is exposed to outside in the slide-in state and the slide-out state, and the method including: displaying first content on the main display area in the slide-in state in which the at least one expandable display area is hidden in the housing, establishing a connection with an external device, determining a first area to display the first content and a second area to display second content based on information received from the external device through the established connection in the slide-out state in which the at least one expandable display area is exposed to outside, and displaying the first content on the determined first area and displaying the second content on the determined second area based on the at least one expandable display area being exposed to outside.

According to various example embodiments, the method may further include at least one of controlling the display to be expanded based on the first area and the second area being determined or displaying guide information for guiding expansion of the at least one expandable display area on the main display area.

According to various example embodiments, the determining of the first area and the second area may include determining the main display area as a first area to display the first content and determining the expandable display area as a second area to display the second content in the state in which the display is expanded.

According to various example embodiments, the determining of the first area and the second area may include at least one of determining the second area to display the second content based on a touch input received on the display, or determining the second area to display the second content based on a detection result of at least one sensor disposed on at least one side of the display.

According to various example embodiments, the method may further include determining a display orientation of the second content to be any one of a landscape mode or a portrait mode, and the determining of the first area and the second area may include determining the second area further based on the determined display orientation of the second content.

According to various example embodiments, the method may further include changing the aspect ratio of at least one piece of the first content and the second content according to the determined first and second areas or determining the first area and the second area based on aspect ratios of the first content and the second content.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a housing;
a display comprising a main display area and at least one expandable display area, the at least one expandable display area is hidden in the housing in a slide-in state and exposed to outside in a slide-out state and the main display area is exposed to outside in the slide-in state and the slide-out state;
a communication module comprising communication circuitry; and
a processor operatively connected to the display and the communication module,
wherein the processor is configured to:
control the display to display first content on the main display area in the slide-in state in which the at least one expandable display area is hidden in the housing;
establish a connection with an external device through the communication module;
determine a first area to display the first content and a second area to display second content based on information received from the external device through the communication module in the slide-out state in which the at least one expandable display area is exposed to outside; and
control the display to display the first content on the determined first area and display the second content on the determined second area based on the at least one expandable display area being exposed to outside.

2. The electronic device of claim 1, wherein the display comprises the at least one expandable display area expandable from the main display area in at least one of upward, downward, left, and right directions.

3. The electronic device of claim 1, wherein the processor is configured to control the display to be exposed to outside based on the first area and the second area being determined.

4. The electronic device of claim 1, wherein the processor is configured to control the display to display guide information for guiding exposing of the at least one expandable display area on the main display area based on the first area and the second area being determined.

5. The electronic device of claim 1, wherein the processor is configured to: determine the main display area as a first area to display the first content and determine the expandable display area as a second area to display the second content in the slide-out state.

6. The electronic device of claim 1, wherein the processor is configured to determine the second area to display the second content based on a touch input received on the display.

7. The electronic device of claim 1, further comprising at least one sensor disposed on at least one side of the display, wherein the processor is configured to determine the second area to display the second content based on a detection result of the sensor.

8. The electronic device of claim 1, wherein the processor is configured to determine the second area to display the second content based on information received from the external device.

9. The electronic device of claim 1, wherein the processor is configured to:
determine a display orientation of the second content to be any one of a landscape mode or a portrait mode; and
determine the second area based on the determined display orientation of the second content.

10. The electronic device of claim 9, wherein the processor is configured to determine the display orientation of the second content based on orientation information of the external device received from the external device through the communication module.

11. The electronic device of claim 9, wherein the processor is configured to determine a size of the first area based on the determined display orientation of the second content.

12. The electronic device of claim 1, wherein the processor is configured to:
change an aspect ratio of at least one piece of the first content and the second content according to the determined first and second areas; or
determine the first area and the second area based on aspect ratios of the first content and the second content.

13. The electronic device of claim 1, wherein the display comprises a first expandable display area expandable in a first direction from the main display area and a second expandable display area expandable in a second direction from the main display area, and
wherein the processor is configured to: control the display to display content received from a first external device in the first expandable display area and display content received from a second external device in the second expandable display area.

14. The electronic device of claim 1, wherein the information received from the external device comprises at least one piece of the second content or link information for obtaining the second content.

15. A method for providing content in an electronic device that comprises a display comprising a main display area and at least one expandable display area, wherein the at least one expandable display area is hidden in a housing of the electronic device in a slide-in state and exposed to outside in a slide-out state and the main display area is exposed to outside in the slide-in state and the slide-out state, and
the method comprising:
displaying first content on the main display area in the slide-in state in which the at least one expandable display area is hidden in the housing;
establishing a connection with an external device;
determining a first area to display the first content and a second area to display second content based on information received from the external device through the established connection in the slide-out state in which the at least one expandable display area is exposed to outside; and displaying the first content on the determined first area and displaying the second content on the determined second area based on the at least one expandable display area being exposed to outside.

16. The method of claim 15, further comprising at least one of:

controlling the display to be exposed to outside based on the first area and the second area being determined; or controlling the display to display guide information for guiding exposing of the at least one expandable display area on the main display area based on the first area and the second area being determined.

17. The method of claim 15, wherein determining the first area and the second area comprises:

determining the main display area as a first area to display the first content; and determining the expandable display area as a second area to display the second content in the slide-out state.

18. The method of claim 15, wherein determining the first area and the second area comprises:

determining the second area to display the second content based on at least one of a touch input received on the display or a detection result of a sensor disposed on at least one side of the display.

19. The method of claim 15, further comprising determining a display orientation of the second content to be any one of a landscape mode or a portrait mode, and wherein determining the first area and the second area comprises determining the second area based on the determined display orientation of the second content.

20. The method of claim 15, further comprising:

changing an aspect ratio of at least one piece of the first content and the second content according to the determined first and second areas; or determining the first area and the second area based on aspect ratios of the first content and the second content.

\* \* \* \* \*